(12) United States Patent
Figueroa

(10) Patent No.: US 8,479,720 B1
(45) Date of Patent: Jul. 9, 2013

(54) HEATING DEVICE AND METHOD

(76) Inventor: Oscar Enrique Figueroa, Santa Tecla (SV)

( * ) Notice: Subject to any disclaimer, the term of this patent is extended or adjusted under 35 U.S.C. 154(b) by 1248 days.

(21) Appl. No.: 12/253,189

(22) Filed: Oct. 16, 2008

(51) Int. Cl.
*A01H 5/08* (2006.01)

(52) U.S. Cl.
USPC .......... 126/15 R; 296/1 R; 296/25 A; 296/26; 296/9 R; 296/110 B; 296/116 R; 431/354; 110/108; 110/110; 110/203

(58) Field of Classification Search
USPC ............... 126/15 R, 1 R, 25 A, 25 R, 26, 9 R, 126/146, 67, 110 B, 116 R, 42, 60, 44; 431/354; 110/108, 110, 203, 345
See application file for complete search history.

(56) References Cited

U.S. PATENT DOCUMENTS

| | | | |
|---|---|---|---|
| 607,642 A * | 7/1898 | Botelho | 126/25 R |
| 941,141 A | 11/1909 | Graff, Jr. | |
| D99,126 S | 3/1936 | Huntington | |
| 2,094,915 A | 10/1937 | Dawson | |
| 2,154,165 A | 4/1939 | Huntington | |
| 2,217,059 A * | 10/1940 | Klute | 126/1 R |
| 2,414,147 A * | 1/1947 | Fleer | 126/77 |
| 2,501,381 A | 3/1950 | Doblin | |
| 2,687,716 A | 8/1954 | Wong | |
| 2,894,448 A | 7/1959 | Henderson et al. | |
| 3,413,935 A | 12/1968 | Behms | |
| 3,430,621 A | 3/1969 | Doty | |
| 3,765,397 A | 10/1973 | Henderson | |
| 4,216,760 A | 8/1980 | Wiggins | |
| 4,345,528 A * | 8/1982 | Allaire et al. | 110/203 |
| 4,410,099 A | 10/1983 | deLarosiere | |
| 4,430,985 A | 2/1984 | Huneycutt | |
| 4,545,360 A | 10/1985 | Smith et al. | |
| 4,747,781 A | 5/1988 | Patenaude | |
| 4,763,640 A | 8/1988 | Schnack et al. | |
| 4,867,050 A | 9/1989 | Patenaude et al. | |
| 4,909,235 A | 3/1990 | Boetcker | |
| 4,924,847 A | 5/1990 | Patenaude | |
| 5,086,752 A | 2/1992 | Hait | |
| 5,094,223 A | 3/1992 | Gonzalez | |
| 5,154,159 A | 10/1992 | Knafelc et al. | |
| 5,218,950 A | 6/1993 | Hait | |
| 5,775,315 A | 7/1998 | Baykal | |
| 5,797,386 A | 8/1998 | Orr | |

(Continued)

FOREIGN PATENT DOCUMENTS

| | | |
|---|---|---|
| DE | 3530816 | 3/1987 |
| DE | 3935846 | 5/1991 |
| TW | 385689 | 3/2000 |
| WO | WO2007/001196 | 1/2007 |

OTHER PUBLICATIONS

Presser, C. et al. "A Numerical Study of Furnace Flame Root Stabilization Using Conical Burner Tunnels." Nineteenth Symposium (International) on Combustion / The Combustion Institute. 1982. pp. 519-527.

(Continued)

*Primary Examiner* — Avinash Savani

(57) ABSTRACT

A new and useful heating device is provided, that is particularly characterized by the efficient way it provides combustion of a carbon based fuel (e.g. wood). A vertically oriented combustion chamber is configured with a relatively narrow, lower portion, a relatively wider upper portion, and a vertically oriented wall structure defining the combustion chamber.

25 Claims, 17 Drawing Sheets

U.S. PATENT DOCUMENTS

| | | | |
|---|---|---|---|
| 6,223,737 B1 * | 5/2001 | Buckner | 126/25 R |
| 6,314,955 B1 | 11/2001 | Boetcker | |
| D479,941 S | 9/2003 | Blanchette | |
| 6,651,645 B1 | 11/2003 | Nunez Suarez | |
| 6,748,939 B1 | 6/2004 | Gober | |
| 6,823,859 B2 | 11/2004 | Yamada et al. | |
| 7,415,979 B1 | 8/2008 | Macri et al. | |
| 7,424,804 B2 | 9/2008 | Bellucci et al. | |
| 7,425,127 B2 | 9/2008 | Zinn et al. | |
| 7,426,928 B2 | 9/2008 | Sanders et al. | |
| 7,438,003 B2 | 10/2008 | Wilfer | |
| 7,438,071 B2 | 10/2008 | Johnson et al. | |
| 7,445,004 B1 | 11/2008 | Milner et al. | |
| 7,445,445 B2 | 11/2008 | Eroglu et al. | |
| 7,448,373 B2 | 11/2008 | Hill et al. | |
| 7,451,759 B2 | 11/2008 | Weiss et al. | |
| 7,455,060 B2 | 11/2008 | Burnett et al. | |
| RE40,590 E | 12/2008 | Shimek et al. | |
| 7,464,537 B2 | 12/2008 | Clark et al. | |
| 7,467,942 B2 | 12/2008 | Carroni et al. | |
| 7,468,497 B2 | 12/2008 | Grisoni | |
| 7,472,698 B1 | 1/2009 | Anibas | |
| 7,475,632 B2 | 1/2009 | Home | |
| 7,476,099 B2 | 1/2009 | Stephens et al. | |
| 7,478,589 B2 | 1/2009 | Woodland et al. | |
| 7,479,006 B2 | 1/2009 | Newsom | |
| 7,479,007 B2 | 1/2009 | Kay | |
| 7,481,650 B2 | 1/2009 | Mosiewicz et al. | |
| 7,487,717 B2 | 2/2009 | Lauro | |
| 7,497,531 B2 | 3/2009 | Gross | |
| 7,510,395 B2 | 3/2009 | Hanno | |
| 7,517,372 B2 | 4/2009 | Sennoun et al. | |
| 7,520,745 B2 | 4/2009 | Oomens et al. | |
| 7,530,351 B2 | 5/2009 | Leverty | |
| 7,533,605 B1 | 5/2009 | Morgan | |
| 7,549,417 B2 | 6/2009 | Dang | |
| 7,559,320 B2 | 7/2009 | Chen | |
| 7,637,258 B2 * | 12/2009 | Cosgrove | 126/25 R |
| 2004/0129262 A1 | 7/2004 | Pieti | |
| 2005/0205076 A1 | 9/2005 | Boucher | |
| 2006/0225724 A1 | 10/2006 | Turner | |
| 2006/0236995 A1 | 10/2006 | Chang | |
| 2007/0204844 A1 | 9/2007 | DiMatteo et al. | |
| 2008/0196708 A1 | 8/2008 | Lee | |
| 2008/0202489 A1 | 8/2008 | Sorenson et al. | |
| 2008/0202493 A1 | 8/2008 | Dettloff | |
| 2008/0202501 A1 | 8/2008 | Sosnowski | |
| 2008/0210214 A1 | 9/2008 | Wade | |
| 2008/0216810 A1 | 9/2008 | Clauss et al. | |
| 2008/0216813 A1 | 9/2008 | Pai | |
| 2008/0216814 A1 | 9/2008 | O'Neill | |
| 2008/0217320 A1 | 9/2008 | Meindl et al. | |
| 2008/0221735 A1 | 9/2008 | Schaffer et al. | |
| 2008/0223266 A1 | 9/2008 | Brazier et al. | |
| 2008/0223355 A1 | 9/2008 | Spencer | |
| 2008/0223356 A1 | 9/2008 | Shenouda | |
| 2008/0227039 A1 | 9/2008 | Flohr et al. | |
| 2008/0230044 A1 | 9/2008 | Warner | |
| 2008/0230045 A1 | 9/2008 | Bruno | |
| 2008/0233525 A1 | 9/2008 | Callas et al. | |
| 2008/0233526 A1 | 9/2008 | Opperman | |
| 2008/0245352 A1 | 10/2008 | Solecki et al. | |
| 2008/0245353 A1 | 10/2008 | Schreiber et al. | |
| 2008/0245356 A1 | 10/2008 | Chuang | |
| 2008/0245357 A1 | 10/2008 | Meether et al. | |
| 2008/0245359 A1 | 10/2008 | Williamson | |
| 2008/0257331 A1 | 10/2008 | Lockhart | |
| 2008/0264404 A1 | 10/2008 | Hoyles et al. | |
| 2008/0264408 A1 | 10/2008 | Konkle et al. | |
| 2008/0271728 A1 | 11/2008 | Pai | |
| 2008/0276923 A1 | 11/2008 | Clauss et al. | |
| 2008/0276924 A1 | 11/2008 | McMillan | |
| 2008/0276926 A1 | 11/2008 | Chang | |
| 2008/0280131 A1 | 11/2008 | Chacko et al. | |
| 2008/0283032 A1 | 11/2008 | Dang | |
| 2008/0289614 A1 | 11/2008 | Carradinha | |
| 2008/0289615 A1 | 11/2008 | Parrish | |
| 2008/0295824 A1 | 12/2008 | Torben | |
| 2008/0314376 A1 | 12/2008 | Chung | |
| 2008/0314946 A1 | 12/2008 | Owenby | |
| 2009/0000493 A1 | 1/2009 | Mosher, II | |
| 2009/0000609 A1 | 1/2009 | Hale | |
| 2009/0017407 A1 | 1/2009 | Fogliani et al. | |
| 2009/0020108 A1 | 1/2009 | Chiang | |
| 2009/0020109 A1 | 1/2009 | Rheault | |
| 2009/0025574 A1 | 1/2009 | Byrnes et al. | |
| 2009/0038605 A1 | 2/2009 | Dahle et al. | |
| 2009/0044381 A1 | 2/2009 | Sellecchia | |
| 2009/0044796 A1 | 2/2009 | Amaral | |
| 2009/0050131 A1 | 2/2009 | Lee | |
| 2009/0056695 A1 | 3/2009 | Cosgrove | |
| 2009/0064988 A1 | 3/2009 | Chiang | |
| 2009/0071462 A1 | 3/2009 | Liu | |
| 2009/0081601 A1 | 3/2009 | Haskin et al. | |
| 2009/0087804 A1 | 4/2009 | Pryor et al. | |
| 2009/0090348 A1 | 4/2009 | Contarino, Jr. | |
| 2009/0095276 A1 | 4/2009 | Kaye | |
| 2009/0095277 A1 | 4/2009 | Johnson et al. | |
| 2009/0098496 A1 | 4/2009 | Poirier | |
| 2009/0107478 A1 | 4/2009 | DeMars et al. | |
| 2009/0107480 A1 | 4/2009 | DeMars et al. | |
| 2009/0107483 A1 | 4/2009 | Fitzgerald et al. | |
| 2009/0114207 A1 | 5/2009 | Koshelanyk | |
| 2009/0120338 A1 | 5/2009 | Adendorff et al. | |
| 2009/0122563 A1 | 5/2009 | Ko et al. | |
| 2009/0139510 A1 | 6/2009 | Adair et al. | |
| 2009/0139511 A1 | 6/2009 | Dalrymple | |
| 2009/0145421 A1 | 6/2009 | Yufer | |
| 2009/0159066 A1 | 6/2009 | Adame et al. | |
| 2009/0159067 A1 | 6/2009 | Croft | |
| 2009/0159068 A1 | 6/2009 | Querejeta et al. | |
| 2009/0162802 A1 | 6/2009 | Strobel et al. | |
| 2009/0165771 A1 | 7/2009 | Selk | |
| 2009/0165772 A1 | 7/2009 | Hunt et al. | |
| 2009/0165773 A1 | 7/2009 | Amory | |
| 2009/0165774 A1 | 7/2009 | Johnston et al. | |

OTHER PUBLICATIONS

Kajitani, S. "A combustion of lean mixture with highly volatile fuel droplets." Fax. of Eng., Ibaraki Univ., Hitachi, Japan. Bulletin of the Japan Society of Mechanical Engineers. vol. 28, No. 245. One page English Abstract of Article, 1985.

* cited by examiner

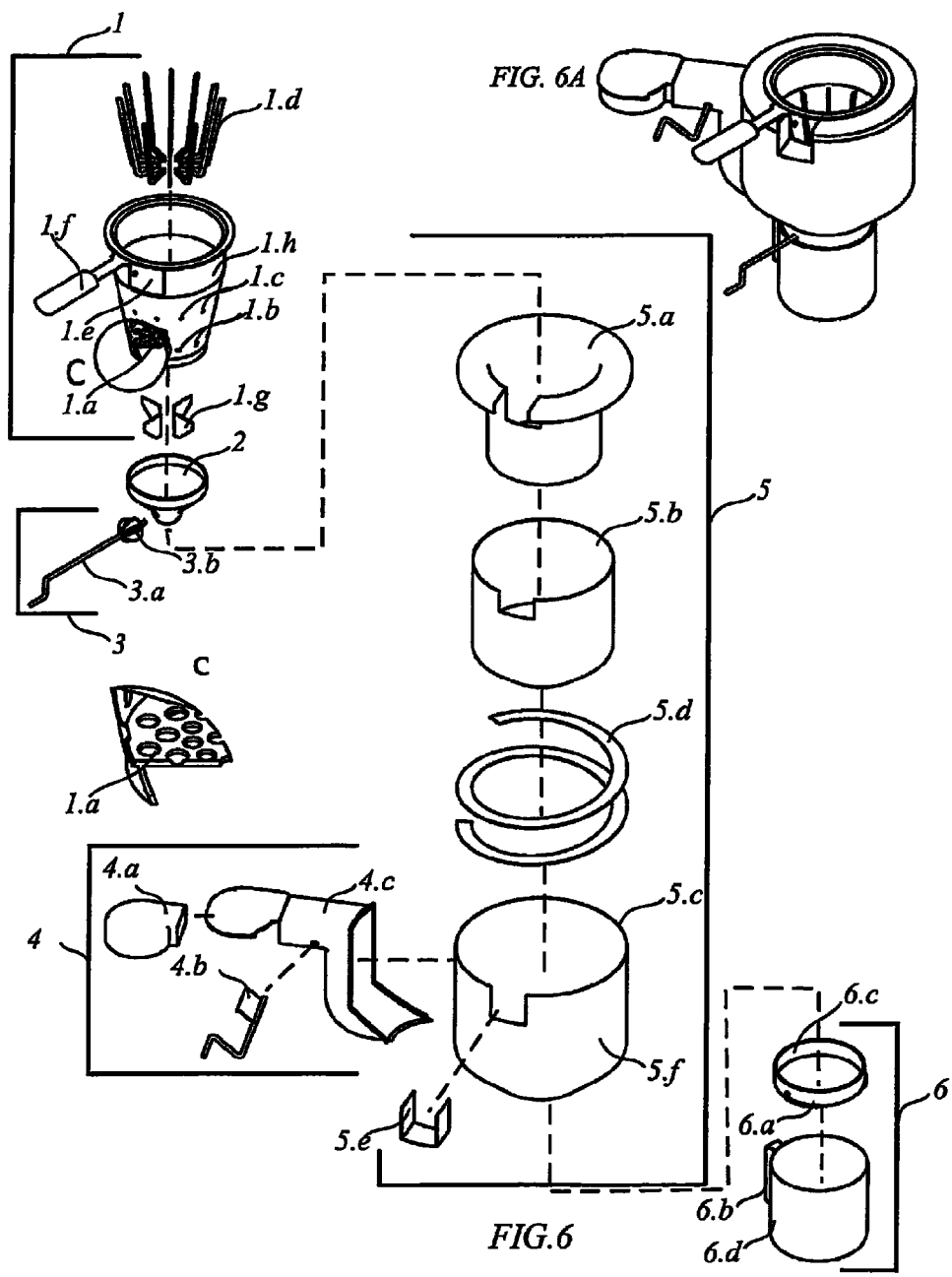

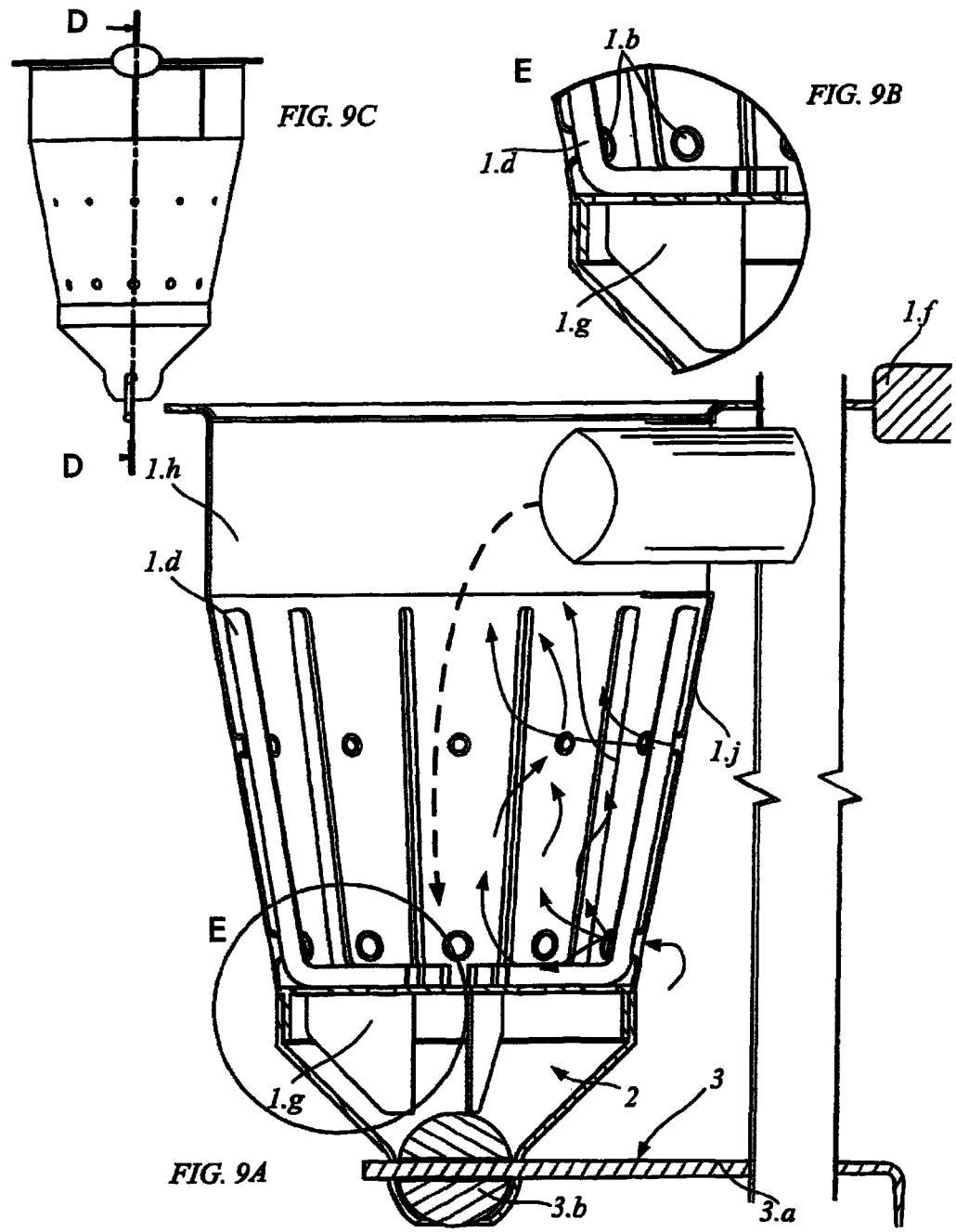

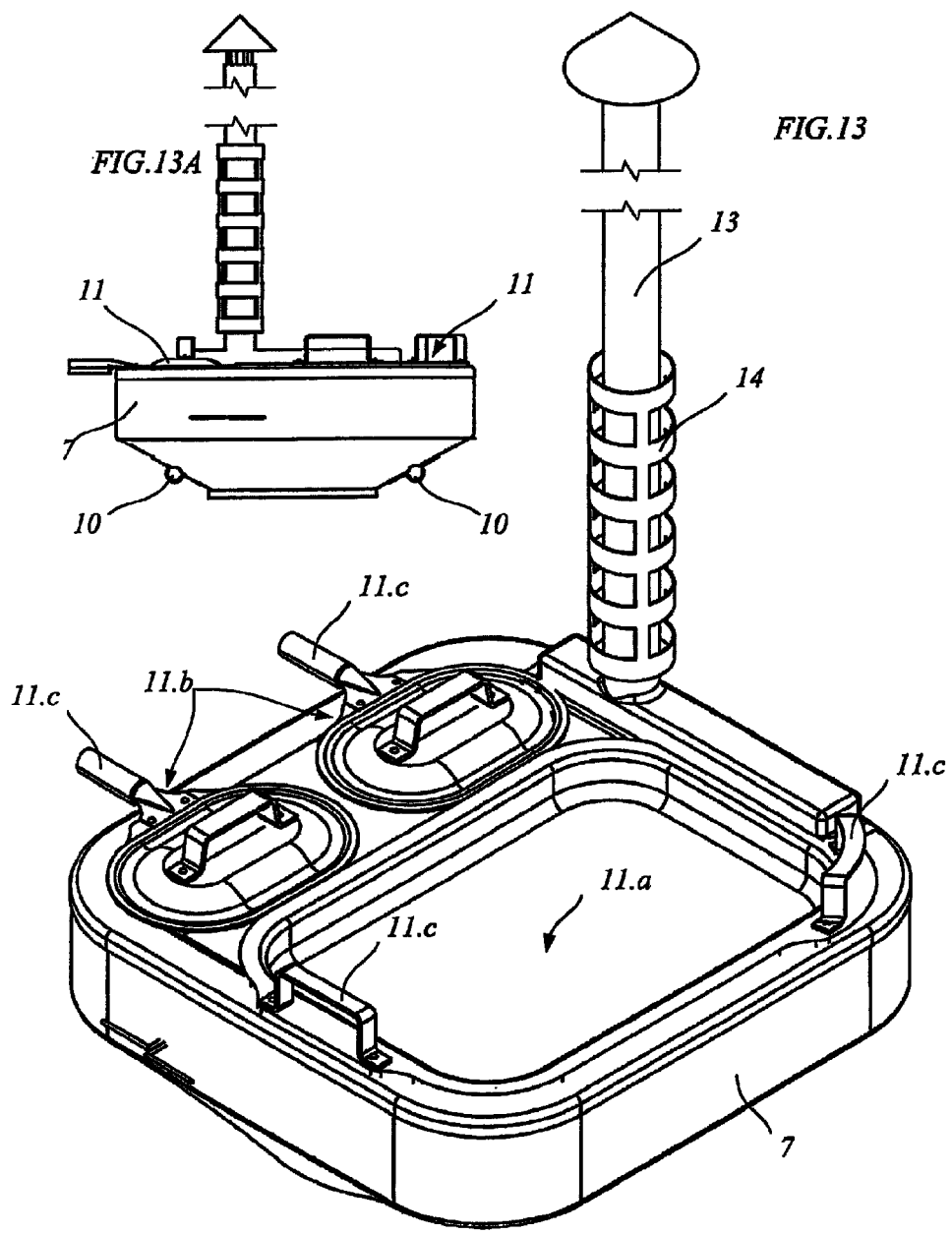

HEATING DEVICE AND METHOD

BACKGROUND

The present invention relates to the field of thermodynamics, particularly in the generation and transfer of heat, and has its specific application in the burning of firewood for cooking for residential use.

Many households in developing and impoverished countries around the world depend heavily on firewood for cooking. Cooking, an everyday chore, not only transfers heat poorly but, has consequences in human health and in the environment due to the gases generated by the inefficiency of the many firewood combustion methods.

From ancient times to the present day, fire has been a valuable tool for human beings; until now, the abundance and availability of firewood has solved heating and cooking needs with ease. However, the availability and ease of obtaining firewood seems to be diminishing due to scarcity of available wood. Intensive logging, deforestation for agriculture, grazing land for cattle and inefficient burning methods are causing an increased difficulty in obtaining firewood.

Firewood is mostly used as fuel in households located in poor areas of the world and in developing countries. The same firewood that has increased human survival by making food preparation easy has also been the cause of respiratory illnesses and other health problems. Traditional combustion is often inefficient, incomplete and generates gases which can cause various health problems.

In recent years, many private, social, governmental and other entities have made efforts to design and disseminate new methods and devices for more efficient combustion of fuel in order to solve the problem, but in applicant's experience these efforts do not appear to have had provided a real, effective solution.

SUMMARY OF THE PRESENT INVENTION

The present invention is intended to provide a new and useful solution to the problem of inefficient combustion, and also to provide an integrated heat generating/transferring device that enables highly efficient fuel combustion and heat transfer that is particularly useful in heating food.

One feature of the present invention is a new and useful heating device, that is particularly characterized by the efficient way it provides combustion of a carbon based fuel (e.g. wood). A vertically oriented combustion chamber is configured with a relatively narrow, lower portion, a relatively wider upper portion, and a vertically oriented wall structure defining the combustion chamber. The vertically oriented wall structure has a plurality of inlet openings to enable air to enter the combustion chamber. A source of air is in fluid communication with the wall structure of the combustion chamber, and a fluid conduit system is configured to direct air from the source along a predetermined path about the vertically oriented wall structure of the combustion chamber. The combustion chamber has support structure configured to (i) support a mass of a carbon based fuel in the relatively narrow, lower portion of the combustion chamber, above the bottom of the combustion chamber and away from the air inlet openings in the vertically oriented wall structure, and (ii) enable air flowing along the predetermined path about the vertically oriented wall structure to flow into the combustion chamber through the inlet openings; whereby the air entering the combustion chamber can substantially envelop and support combustion of the mass of carbon based fuel located in the combustion chamber. The relatively narrow and wider portions of the combustion chamber are configured to allow gases generated from combustion of a carbon based fuel in the relatively narrow portion of the combustion chamber to expand as they rise into the relatively wider portion of the combustion chamber, in a manner that reduces the output speed of the gases, increases the residence time of the gases in the combustion chamber, thereby to improve the efficiency with which heat is generated in the combustion chamber from a carbon based fuel.

According to a preferred embodiment, the air inlet openings comprise first and second arrays of air inlet openings in the vertically oriented wall structure of the combustion chamber, each of the first and second arrays of air inlet openings oriented to enable air to enter the combustion chamber in a direction that is lateral to the vertical direction of the combustion chamber. The first array of air inlet openings are oriented to enable air to enter the narrow portion of the combustion chamber in a manner such that at least some air can flow into the area between a mass of carbon based fuel and the bottom of the combustion chamber, and the second array of air inlet openings are oriented to enable air to enter the combustion chamber so that at least some of the air that enters the combustion chamber through the second array of air inlet openings is above a mass of carbon based fuel located in the narrow portion of the combustion chamber. Moreover, the second array of air inlet openings is also oriented so that air entering the combustion chamber above a mass of carbon based fuel creates air turbulence above a mass of carbon based fuel located in the combustion chamber.

The configuration of the combustion chamber, the air entering the combustion chamber through the first and second arrays of air inlet openings, and the air turbulence promote substantially complete combustion of the volatile organic compounds of the carbon based fuel.

In accordance with the applicant's integrated approach to cooking, a heating chamber is provided above and in heat transfer relationship with the relatively wider portion of the combustion chamber, and heating plate structure substantially closes and is in heat transfer relationship with the heating chamber, so that substantially all heat from the heating chamber is transferred to the heating plate structure, and the heating plate structure is configured to heat a food product or cookware disposed on the heating plate structure.

In addition, according to a preferred embodiment, insulation structure extends about the vertically oriented wall structure of the combustion chamber, and the fluid conduit system that directs air about the combustion chamber is disposed between the insulation layer and the vertically oriented wall structure of the combustion chamber, so that air directed by the fluid conduit system is swept along the exterior of the vertically oriented wall structure. Moreover, the fluid conduit system is further configured to direct air along a substantially spiral path about the vertically oriented wall structure, whereby air is swept in a spiral path along the vertically oriented wall structure, and heat from the vertically oriented wall structure is transferred to the air being swept in the spiral path along the vertically oriented wall structure. Also, an ash collection structure (e.g. an ashtray like container) is disposed below the narrow portion of the combustion chamber, and a valve is provided that can be selectively opened by manipulation of a handle extending outside the combustion chamber, while combustion of the carbon fuel in the combustion chamber is continuing, to enable ashes resulting from combustion of the carbon based fuel in the combustion chamber to be deposited into the ash collection container while combustion in the combustion chamber is continuing.

Additionally, the device is designed with a new and useful way to load a mass of fuel into the combustion chamber, and a new and useful way to monitor the state of combustion and the fuel in the combustion chamber while combustion is taking place in the combustion chamber. Specifically, the vertically oriented wall structure of the combustion chamber has an opening that can be selectively covered or uncovered. The opening, when uncovered, is positioned to enable the state of combustion and the state of the carbon based fuel in the combustion chamber to be viewed while combustion is taking place in the combustion chamber and to enable insertion of additional carbon based fuel into the combustion chamber while combustion is taking place in the combustion chamber.

Still further, according to a preferred embodiment, the support structure for the mass of carbon based fuel comprises a basket like structure comprising a plurality of ribs disposed inside the combustion chamber, the ribs located and configured to support a mass of carbon based fuel above the bottom of the combustions chamber and away from the vertically oriented wall structure. Also, the heating plate structure and the heating chamber are configured such that heat and/or heated air from the heating chamber will sweep along the heating plate structure in a predetermined direction as heat is being transferred to the heating plate structure. In addition, the heating chamber can be used to heat one or a plurality of pieces of cookware in heat transfer relationship with respective portions of the heating chamber. Moreover, a layer of insulation surrounds the walls of the heating chamber, to minimize transfer of heat from the walls of the heating chamber to the environment outside the heating chamber.

In a cooking method according to the principles of the present invention, a vertically oriented, combustion chamber is provided with a vertically oriented wall structure having a relatively narrow, lower portion, and a relatively wider upper portion, and air inlet openings located in the vertically oriented wall structure to enable air to be directed into the combustion chamber. Moreover, a heating chamber is provided above and in heat transfer relationship with the relatively wider upper portion of the combustion chamber and heating plate structure is in direct heat transfer relation with the heating chamber. A mass of carbon based fuel is located in the relatively narrow lower portion of the combustion chamber, above the bottom of the lower portion of the combustion chamber, and spaced from the air inlet openings in the vertically oriented wall structure of the combustion chamber. Air is directed along a predetermined path that enables the air to enter the combustion chamber through the air inlet openings in the vertically oriented wall structure, in a manner that supports substantially complete combustion of the carbon based fuel in the combustion chamber, and generation of heat from the combustion of the carbon based fuel; and substantially all of the heat generated from combustion of the carbon based fuel in the combustion chamber is directed into the heating chamber, so that substantially all of the heat from the combustion chamber is transferred to the heating plate structure.

According to a preferred method, air is directed along a path that enables air to flow into the combustion chamber comprises directing air along a path that enables air to flow into the combustion chamber in directions lateral to the mass of carbon based fuel located in the combustion chamber, and in a manner that enables at least some air to flow into the area below the mass of carbon based fuel and at least some of the air to flow into the combustion chamber above the mass of carbon based fuel, further to enhance the efficiency with which heat is generated from the carbon based fuel in the combustion chamber. Also, the air is directed along a path that enables at least some air to flow into the combustion chamber above the mass of carbon based fuel located in the narrow portion of the combustion chamber to create air turbulence above the mass of carbon based fuel located in the combustion chamber. The air that is directed along the predetermined path is swept along the exterior of the combustion chamber, in a substantially spiral path, so that heat from the exterior of the combustion chamber is transferred to the air that is being swept along the exterior of the combustion chamber.

Also, according to a preferred method the carbon based fuel comprises a cellulose based fuel, preferably wood, and ash resulting from the combustion of the carbon based fuel in the combustion chamber is selectively removed from the combustion chamber, without insertion of any removal instrument into the combustion chamber, while combustion of the carbon based fuel is continuing in the combustion chamber. Moreover, the combustion chamber can be pivoted to a position in which it is removed from heat transfer relationship with the heating chamber to enable a mass of carbon based fuel to be located in the combustion chamber, and thereafter the combustion chamber can be pivoted back to a position in which the heating chamber is in heat transfer relationship with the relatively wider upper portion of the combustion chamber.

Still further, in a preferred method according to the principles of the present invention, a plurality of pieces of cookware are provided, each of which is in direct heat transfer relationship with the heating chamber, so that substantially all of the heat generated from combustion of the carbon based fuel in the combustion chamber is directed to respective portions of the cookware, to transfer substantially all of the heat from the combustion chamber to the cookware.

With the device and method of the present invention, highly efficient firewood combustion is provided, and the heated gases from combustions are used in a highly efficient way to heat food. The incandescent gases generated from combustion undergo a process of expansion because they travel from a smaller diameter to a larger diameter, achieving a reduction in the output speed and increasing the time of residence within the combustion chamber; and this momentary retention of gases within the combustion chamber achieves a highly efficient combustion. The heat generated by the combustion chamber is transferred to a heating chamber and used in a way that provides an efficient heating process, particularly for heating food product. The heat generating/transferring device of the invention is mounted on a worktable that facilitates the preparation and cooking of food. The worktable also provides enough space to store firewood, cookware and at the same time allows space for several (e.g. three) people to sit around it to eat.

Other features of the present invention will become apparent from the following detailed description and the accompanying drawings.

BRIEF DESCRIPTION OF THE DRAWINGS

FIG. 3A is provided as a reference, and FIG. 3 is taken along line A-A of FIG. 3A;

FIG. 6 is an exploded view of the heat generating device of FIG. 5, with a detailed view of the fire grill shown in portion C (and where an overall view of the heat generating/transferring device is shown as a reference in FIG. 6A);

FIG. 9A shows a cross section view of the combustion chamber, ashtray, and butterfly valve, taken along the line D-D in reference FIG. 9C, wherein the flow of air in the process of combustion, which enters through the lateral perforations of the combustion chamber is schematically shown in FIG. 9A, FIG. 9B shows region E, the bottom of the combustion chamber, in detail, including the inferior perforations, blades for ash removal, and part of the fire grill can be seen, and FIG. 9A schematically shows a piece of wood on its path from entry to its fall toward the bottom of the combustion chamber;

FIGS. 13 and 13A are frontal and isometric views, respectively, of the heat transferring portion of the device, according to the principles of the present invention;

DETAILED DESCRIPTION

Figure 1:
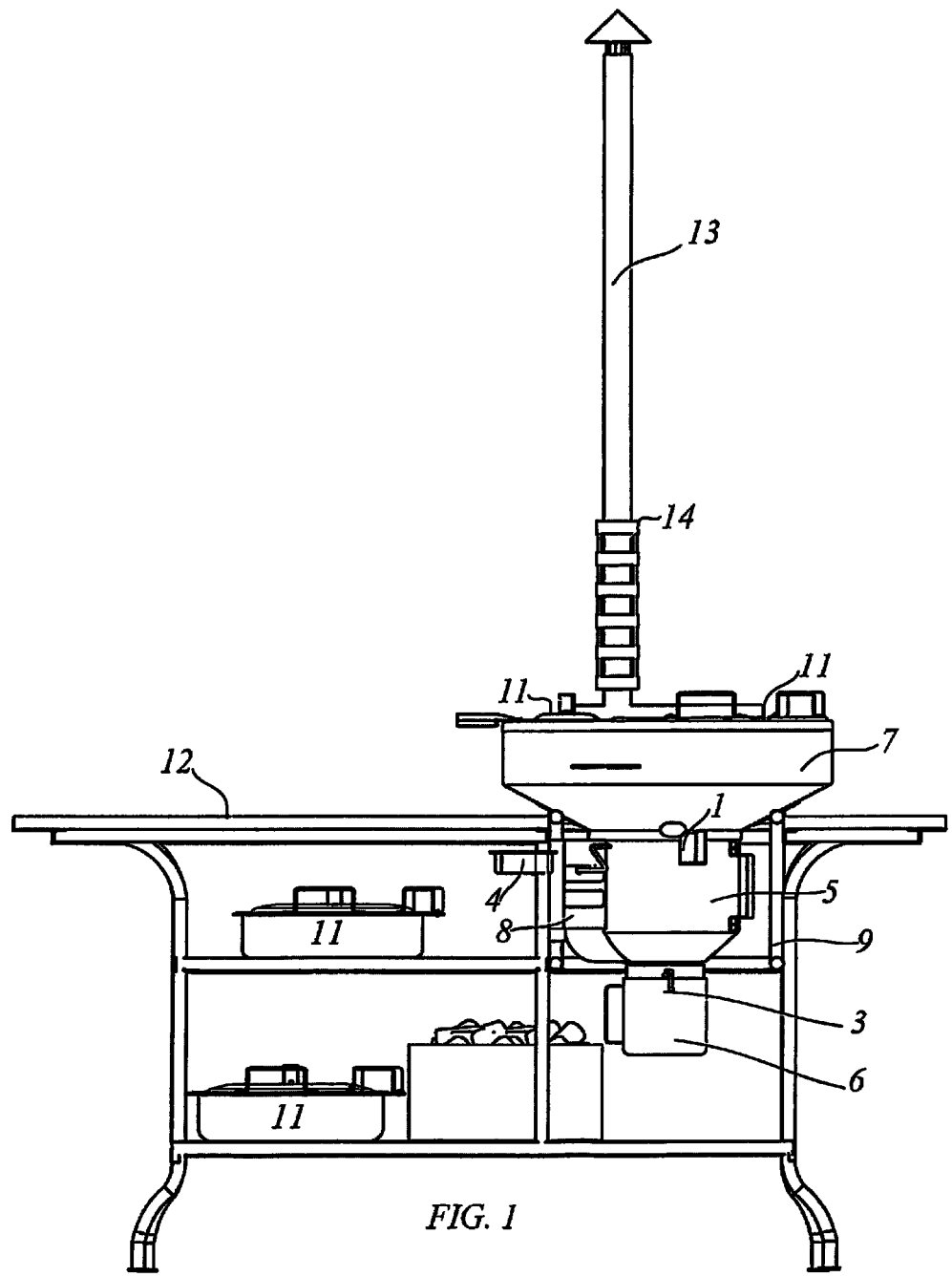
FIG. 1 is a front view of a food cooking station with a heat generating/transferring device according to the principles of the present invention.

As described above, the present invention provides a heat generating/transferring device and method, that is particularly useful in heating food products. The principles of the present invention are described below in connection with a system and method for heating food products, and from that description the manner in which the principles of the invention can be used for various types of heating applications will be apparent to those in the art.

One feature of the present invention is a new and useful heating device, that is particularly characterized by the efficient way it provides combustion of a carbon based fuel (e.g. wood). A vertically oriented combustion chamber 1 is configured with a relatively narrow, lower portion, a relatively wider upper portion, and a vertically oriented wall structure 1.*j* (see e.g. FIGS. 8A, 9A, 9C, 10) defining the combustion chamber. The vertically oriented wall structure has arrays of inlet openings 1.*b*, 1.*c*, to enable air to enter the combustion chamber. A source of air (comprising a fan system 4 with a fan 4.*a* [see FIG. 6] and a conduit system that directs air from the fan) is in fluid communication with the wall structure of the combustion chamber, and directs air from the source along a predetermined path about the vertically oriented wall structure of the combustion chamber (see e.g. FIG. 10). The combustion chamber has support structure 1.*d* configured to (i) support a mass of a carbon based fuel in the relatively narrow, lower portion of the combustion chamber, above the bottom of the combustion chamber and away from the air inlet openings in the vertically oriented wall structure; and (ii) enable air flowing along the predetermined path about the vertically oriented wall structure to flow into the combustion chamber through the inlet openings; whereby the air entering the combustion chamber can substantially envelop and support combustion of the mass of carbon based fuel located in the combustion chamber (see e.g. FIG. 10). The relatively narrow and wider portions of the combustion chamber are configured to allow gases generated from combustion of a carbon based fuel in the relatively narrow portion of the combustion chamber to expand as they rise into the relatively wider portion of the combustion chamber, in a manner that reduces the output speed of the gases, increases the residence time of the gases in the combustion chamber, thereby to improve the efficiency with which heat is generated in the combustion chamber from a carbon based fuel.

According to a preferred embodiment, the air inlet openings comprise first and second arrays 1.*b*, 1.*c*, of air inlet openings in the vertically oriented wall structure of the combustion chamber (see e.g. FIGS. 10, 11), each of the first and second arrays of air inlet openings oriented to enable air to enter the combustion chamber in a direction that is lateral to the vertical direction of the combustion chamber. The first array of air inlet openings 1.*b* are oriented to enable air to enter the narrow portion of the combustion chamber in a manner such that at least some air can flow into the area between a mass of carbon based fuel and the bottom 1.a of the combustion chamber, and the second array of air inlet openings 1.c are oriented to enable air to enter the combustion chamber so that at least some of the air that enters the combustion chamber through the second array of air inlet openings is above a mass of carbon based fuel located in the narrow portion of the combustion chamber (see e.g. FIG. 10). Moreover, the second array of air inlet openings 1.c is also oriented so that air entering the combustion chamber above a mass of carbon based fuel creates air turbulence above a mass of carbon based fuel located in the combustion chamber.

The configuration of the combustion chamber, the air entering the combustion chamber through the first and second arrays of air inlet openings 1.b, 1.c, and the air turbulence promote substantially complete combustion of the volatile organic compounds of the carbon based fuel.

Figure 3:
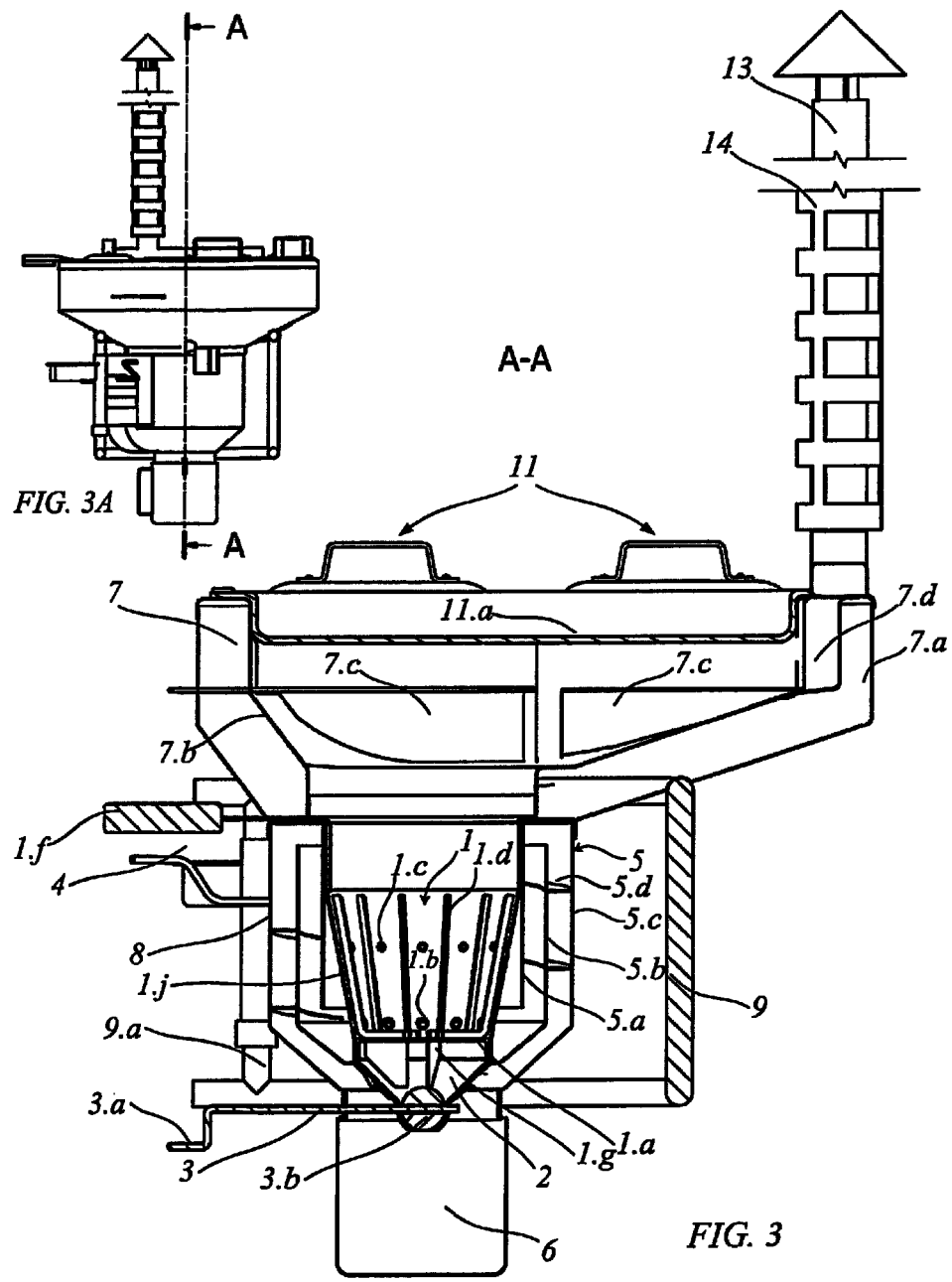
FIG. 3 is a transverse cross section of the heat generating/transferring device in FIG. 2, where
Figure 15A:
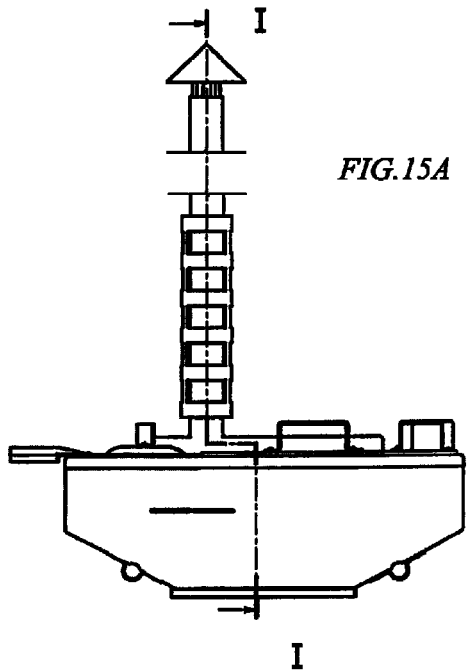
FIG. 15 is a cross section of the heat transferring device, taking along line I-I in reference FIG. 15A, and schematically illustrating the flow of combustion gases along the heating plate structure and toward a chimney and their contact with the heating plate structure, in a device and method according to the principles of the present invention.
Figure 15:
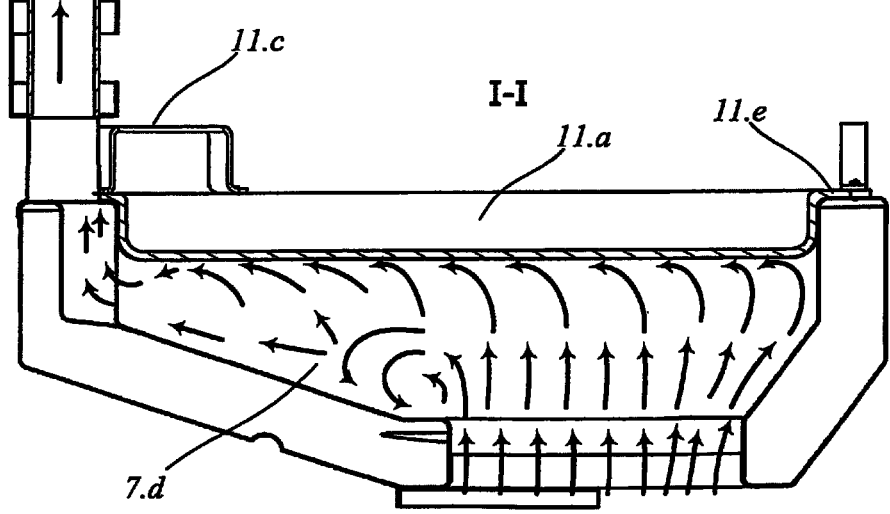

In accordance with the applicant's integrated approach to cooking, a heating chamber 7.d (see e.g. FIGS. 3, 15) is provided above and in heat transfer relationship with the relatively wider portion of the combustion chamber, and heating plate structure 11.a substantially closes and is in heat transfer relationship with the heating chamber, so that substantially all heat from the heating chamber is transferred to the heating plate structure, and the heating plate structure 11.a functions as a component of cookware that is configured to heat a food product (or other cookware components) disposed on the heating plate structure (see e.g. FIG. 15).

In addition, according to a preferred embodiment, insulation structure 5 extends about the vertically oriented wall structure of the combustion chamber, and wherein the fluid conduit that directs air about the combustion chamber is disposed between the insulation structure and the vertically oriented wall structure 1.j of the combustion chamber (FIG. 3), so that air directed by the fluid conduit is swept along the exterior of the vertically oriented wall structure. Moreover, the fluid conduit system is further configured to direct air from the fan system 4 along a substantially spiral path about the vertically oriented wall structure 1.j (see e.g. FIG. 12), whereby heat from the vertically oriented wall structure is transferred to the air being swept in the spiral path along the vertically oriented wall structure. Also, an ash collection system 2, 6 (FIG. 3) is disposed below the narrow portion of the combustion chamber, and a valve 3 is provided that can be selectively opened by manipulation of a handle 3.a extending outside the combustion chamber, while combustion of the carbon fuel in the combustion chamber is continuing, to enable ashes resulting from combustion of the carbon based fuel in the combustion chamber to be deposited into an ash collection container 6 while combustion in the combustion chamber is continuing. Additionally, the device is designed with a new and useful way to load a mass of fuel into the combustion chamber, and a new and useful way to monitor the state of combustion and the fuel in the combustion chamber while combustion is taking place in the combustion chamber.

The support structure for the mass of carbon based fuel comprises a basket like structure 1.d (FIGS. 3, 6, 8C) comprising a plurality of ribs disposed inside the combustion chamber, the ribs located and configured to support a mass of carbon based fuel above the bottom of the combustion chamber (FIG. 8C) and away from the vertically oriented wall structure.

The heating plate structure 11.a and the heating chamber 7.d are configured such that heat and/or heated air from the heating chamber will sweep along heating plate structure in a predetermined direction as heat is being transferred to the heating plate structure (see e.g. FIG. 15).

A plurality of heating sections (see e.g. FIGS. 13, 14) can be located in heat transfer relationship with respective portions of the heating chamber. The heating sections can be adjacent heating plate 11.a, and can be used to heat additional cookware 11.b (FIG. 13).

A layer of insulation 7 surrounds the walls of the heating chamber 7.d, to minimize transfer of heat from the walls of the heating chamber to the environment outside the heating chamber.

Further Details of Device and Method

Figure 10:
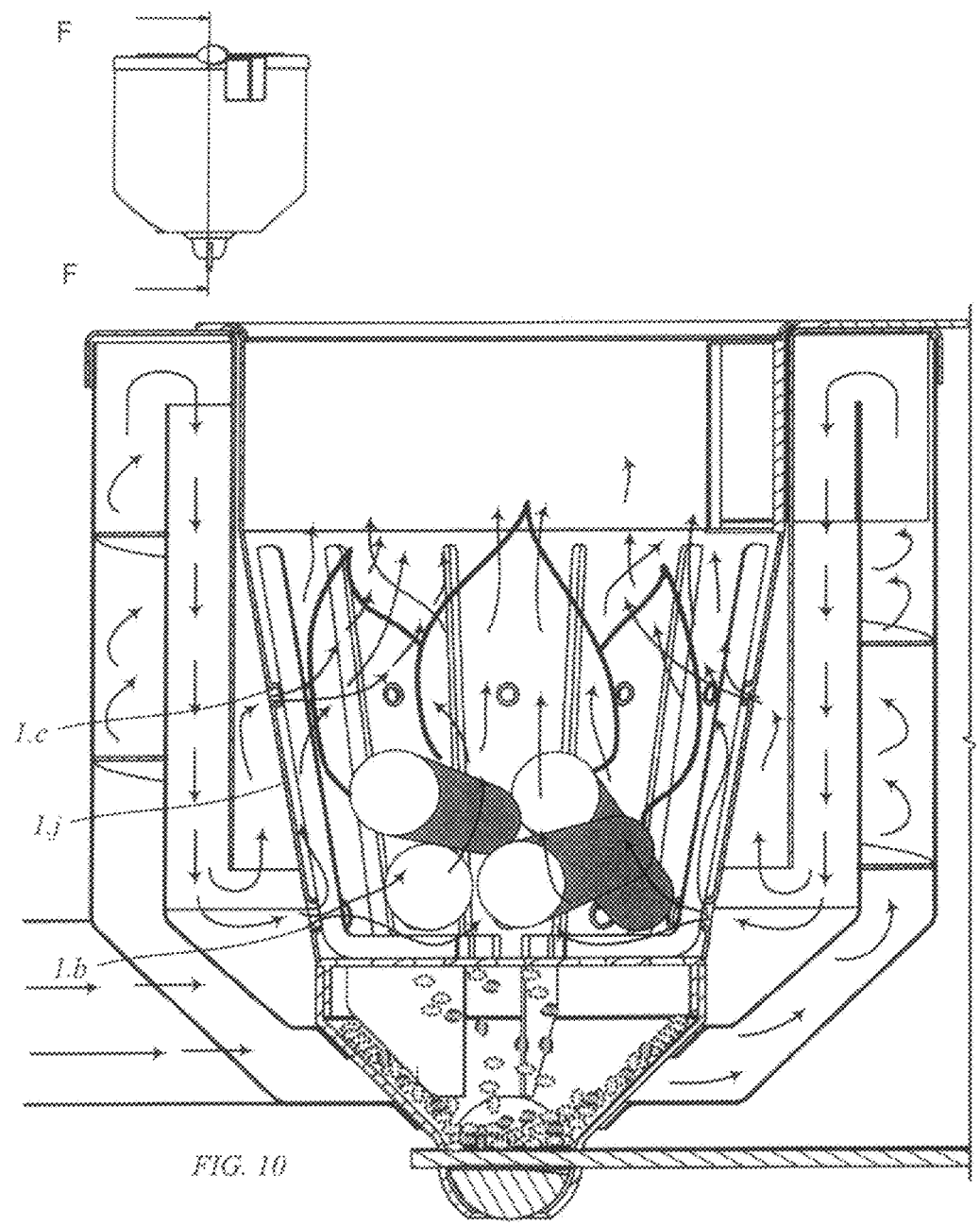
FIG. 10 schematically illustrates the principles of air ingress for combustion, air distribution and ash removal, in the heat generating device of the present invention (where FIG. 10 is taken from the direction F-F in reference FIG. 10A)

The combustion chamber 1 is preferably conically shaped, and vertically oriented, with its upper end bounded by a tubular ring 1.h. The combustion chamber 1 is oriented vertically with its narrow side down. A flat, perforated plate 1.a (FIGS. 6, 9A, 9B) is located inside and at the bottom of the combustion chamber; and serves as a grill to hold the firewood as it burns. The incandescent gases generated from the firewood flow towards the upper, wider end of the combustion chamber 1, and as schematically illustrated in FIG. 10, undergo an expanding process because they go from a smaller to a larger diameter, achieving a reduction in the speed of output and a greater time of residence within the combustion chamber 1; this momentary retention of gases inside the combustion chamber 1 produces a highly efficient combustion.

Figure 4:
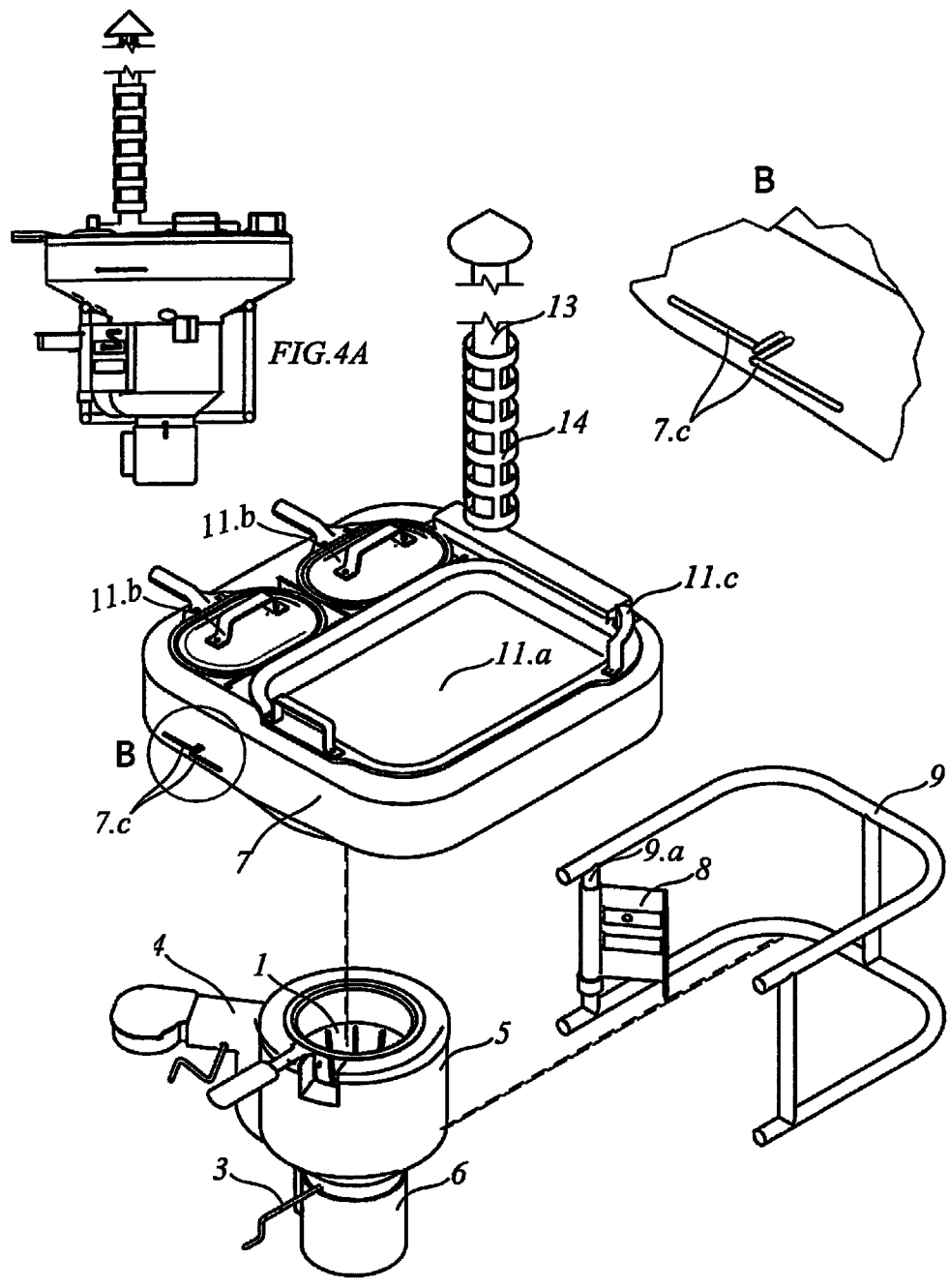
FIG. 4 is an exploded view of components forming the heat generating/transferring device of FIG. 2, with an enlarged view of portion B, (and where FIG. 4A provides an overall view of the heat generating/transferring device as a reference)
Figure 5:
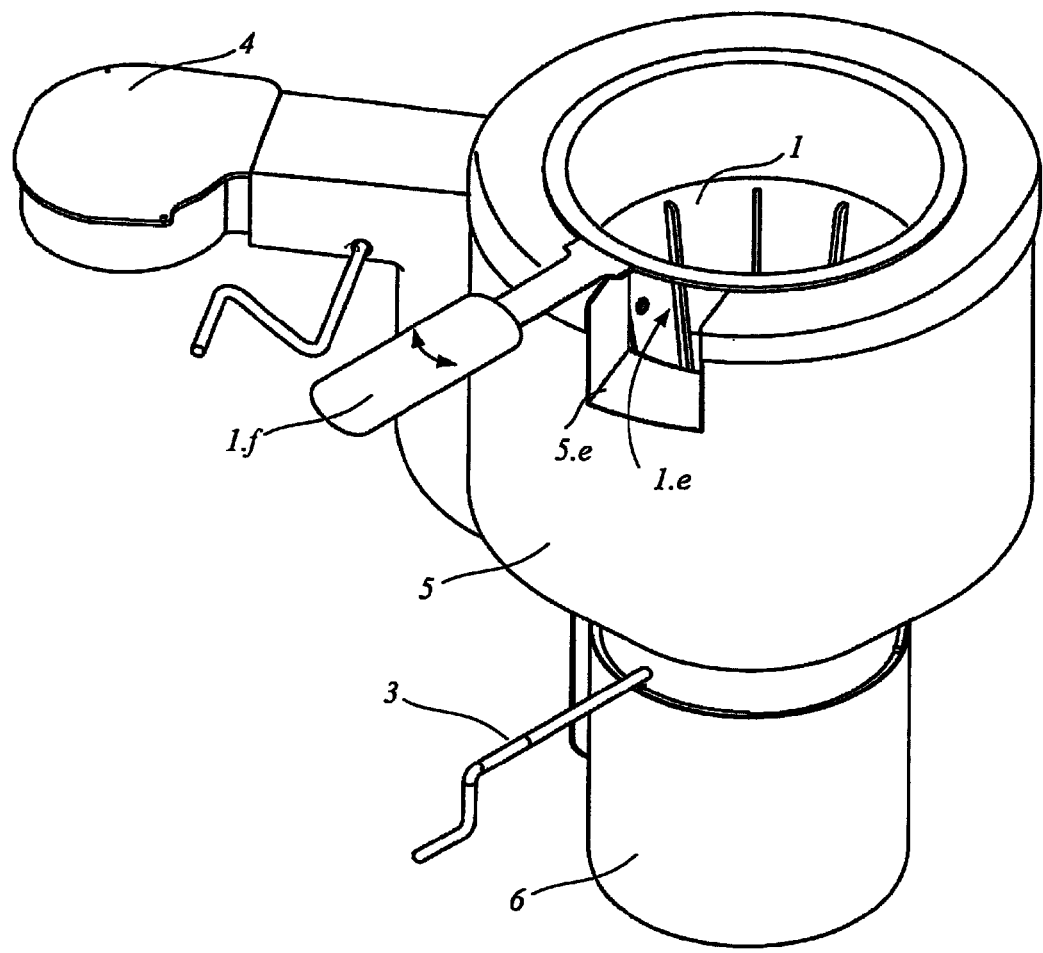
FIG. 5 is an isometric view of the heat generating device of FIG. 2.

The arrays of air inlet openings 1.b, 1.c (FIGS. 8B and 8C) are distributed in the form of two arrays of the openings, with input directed perpendicularly through the vertically oriented wall structure 1.j of the combustion chamber and directed toward its vertical axis. The first array of perforations 1.b is located near the bottom of the combustion chamber, the second array 1.c is located at about the middle of the combustion chamber, and in any event at a location in which the second array would normally be above a mass of firewood in the combustion chamber. The perforations allow a flow of air from fan system 4 (FIGS. 4, 12) to enter the inner part of the combustion chamber 1, bringing the oxygen needed for combustion. Moreover, the perforations 1.b, 1.c are arranged in such a way that the first array 1.b, located on the lower part of the combustion chamber, injects air below the wood and above the fire grill 1.a, where the fire wood is lifted off the bottom and held off the side walls by the set of ribs that form the support structure 1.d located on the bottom and sides of the combustion chamber 1, allowing the air to envelop the firewood. The second array of perforations 1.c injects air above the allowable load of firewood, providing an excess of air for proper combustion; in addition, the turbulence generated by the airflow improves the mixing of the secondary air with incandescent gases in the process of burning, ensuring a more complete combustion, as shown in FIG. 9 and FIG. 10.

A square opening 1.e (FIGS. 5, 6 8C, 12) located in the tubular ring 1.h at the upper end of the upper combustion chamber, allows the entry of the wood to the interior of the combustion chamber 1, while combustion is taking place in the combustion chamber. Also, the square opening 1.e enables the state of combustion and the state of the firewood in the combustion chamber to be viewed while combustion is taking place in the combustion chamber (see e.g. FIGS. 7F, 12).

The insulation Chamber 5 (FIG. 6) formed by concentric tubes 5.a, 5.b and 5.c is installed around the combustion chamber 1. The insulation chamber holds the heat the combustion chamber 1 loses through its wall structure and returns it to the process of combustion inside the combustion chamber 1. This heat retention is made possible by the circulating air blown by the fan 4.a, and transmitted by the air conduit system, to oxygenate the combustion, into and through the concentric cavities of the insulation chamber where the heat, which is trying to escape, is trapped by the incoming air (as that air sweeps along the vertically oriented wall of the combustion chamber) and transported into the interior of the combustion chamber (e.g. as shown schematically in FIG. 10, FIG. 11 and FIG. 12).

Figure 11:
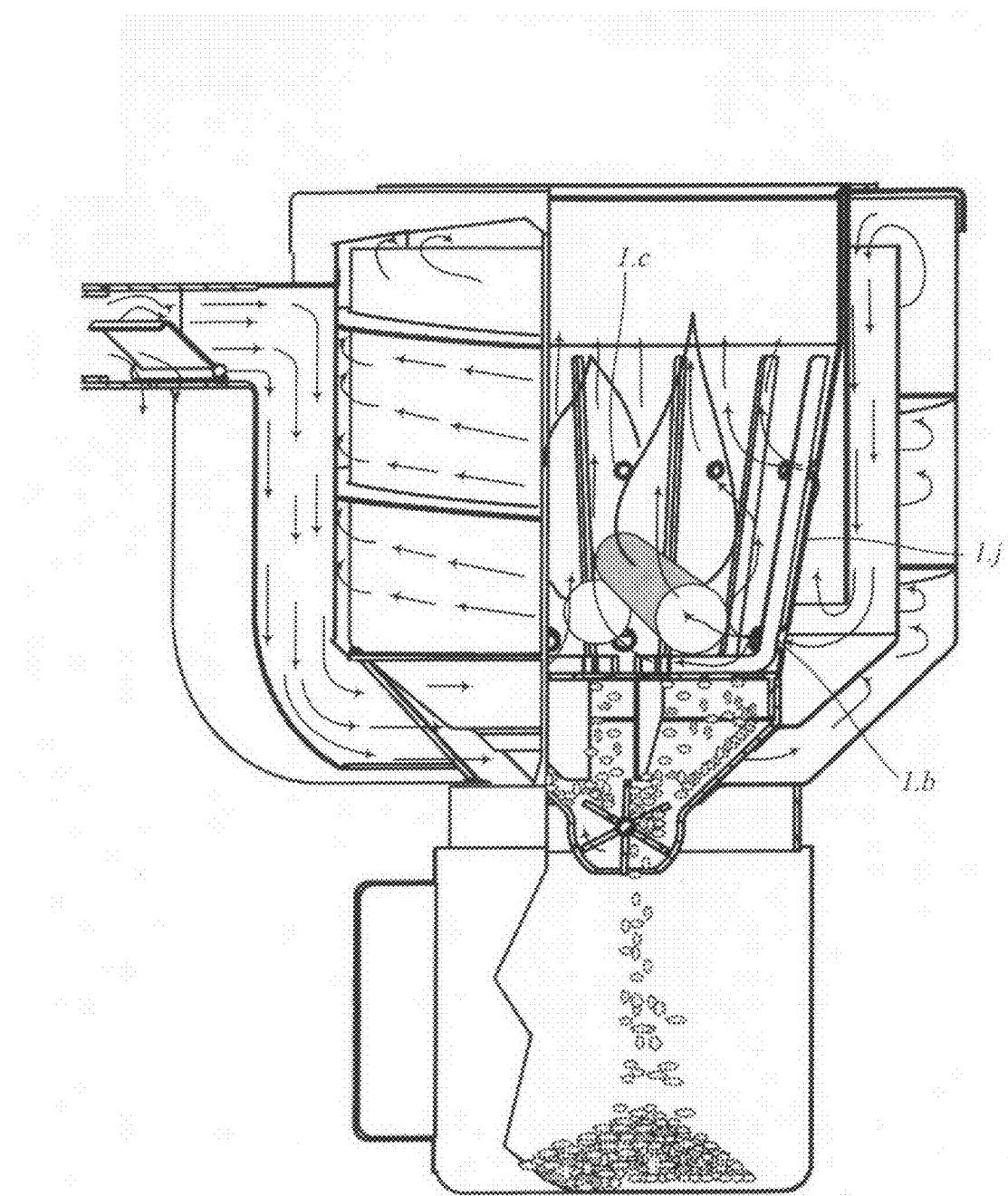
FIG. 11 schematically illustrates the principles of air flow into the combustion chamber, air distribution within the combustion chamber, and air flow about the vertically extending wall of the combustion chamber, and ash removal, according to the principles of the present invention.
Figure 12:
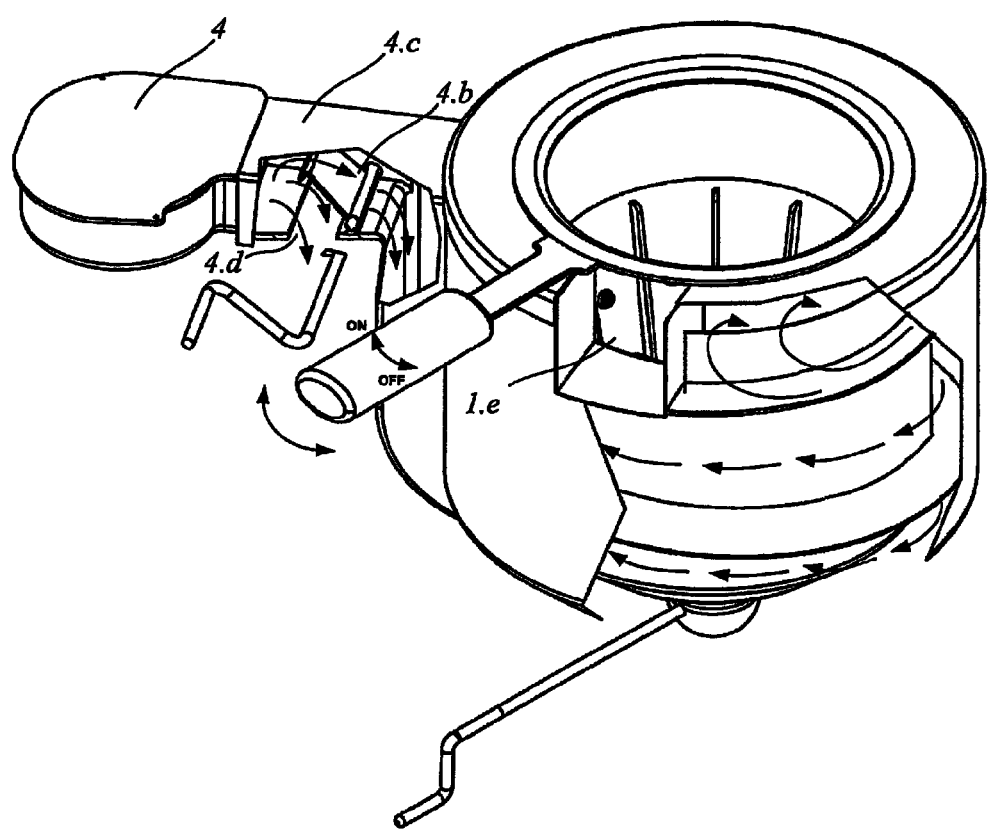
FIG. 12 is an isometric view and sections of important elements of the heat generating device of the present invention, that schematically shows the route followed by the air blown by a fan in its way to the inner part of the combustion chamber and the use of the excess air to cool the combustion chamber, and also schematically showing the direction to which the handle of the combustion chamber turns to its ON/OF position, where in the ON position, the firewood intake openings (in the combustion chamber as well as the insulation chamber) are aligned to facilitate the firewood intake, and in the OFF position, the openings are out of alignment to close the opening and stop the heat from escaping.

A flat, rectangular spiral, 5.*d* (FIG. 6) guides the air around the external cavity between the combustion chamber wall structure 1.*j* and the insulation chamber 5, fully sweeping the trapped heat in a balanced way (see FIGS. 10, 11 and 12). This sweeping process also efficiently cools the outside of the insulation chamber 5 and lowers the temperature to a level that does not pose a danger to its users.

Figure 7A:
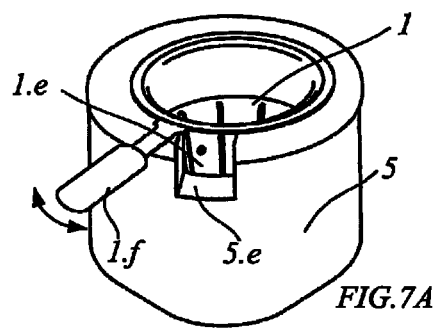
FIG. 7A and FIG. 7C show how the wood feeder is opened by aligning an inner chute with a U shaped opening on the outside of an insulation chamber; where
Figure 7B:
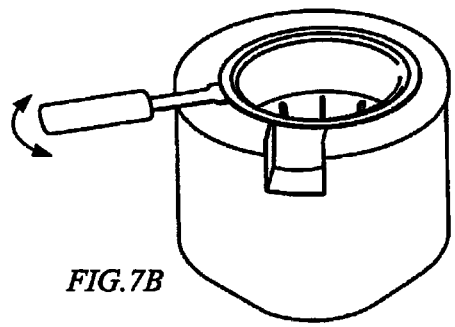
FIGS. 7B and 7D show these elements misaligned in order to prevent the escape of heat, and where FIGS. 7E and 7F schematically illustrate how these elements are used to enable a person to view the state of combustion and the wood fuel in the combustion chamber during the combustion process (FIG. 7F being a sectional view taken from J-J in FIG. 7E)
Figure 7C:
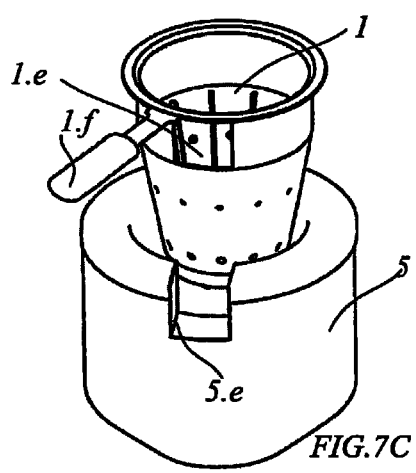
Figure 7D:
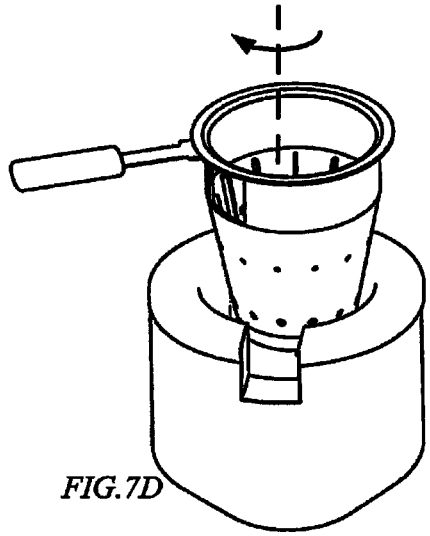
Figure 7E:
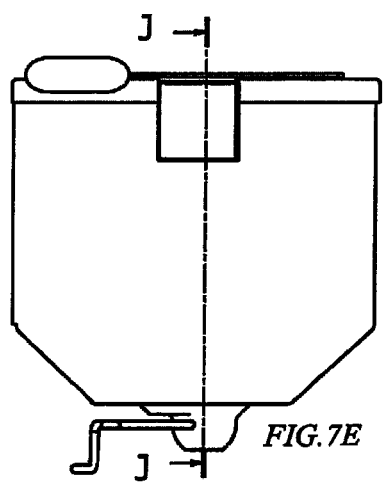
FIGS. 7 A-E are views of the heat generating device of the present invention, schematically showing how the combustion chamber is moved by means of a handle located on the upper edge, where
Figure 7F:
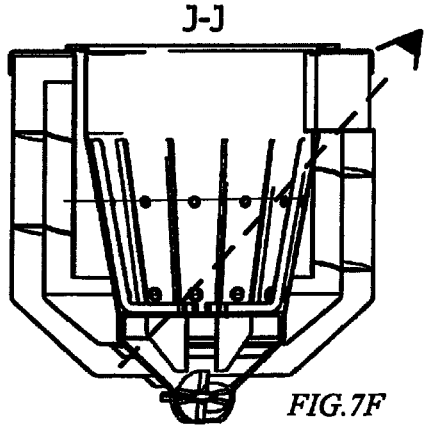
Figures 8A, 8B, 8C:
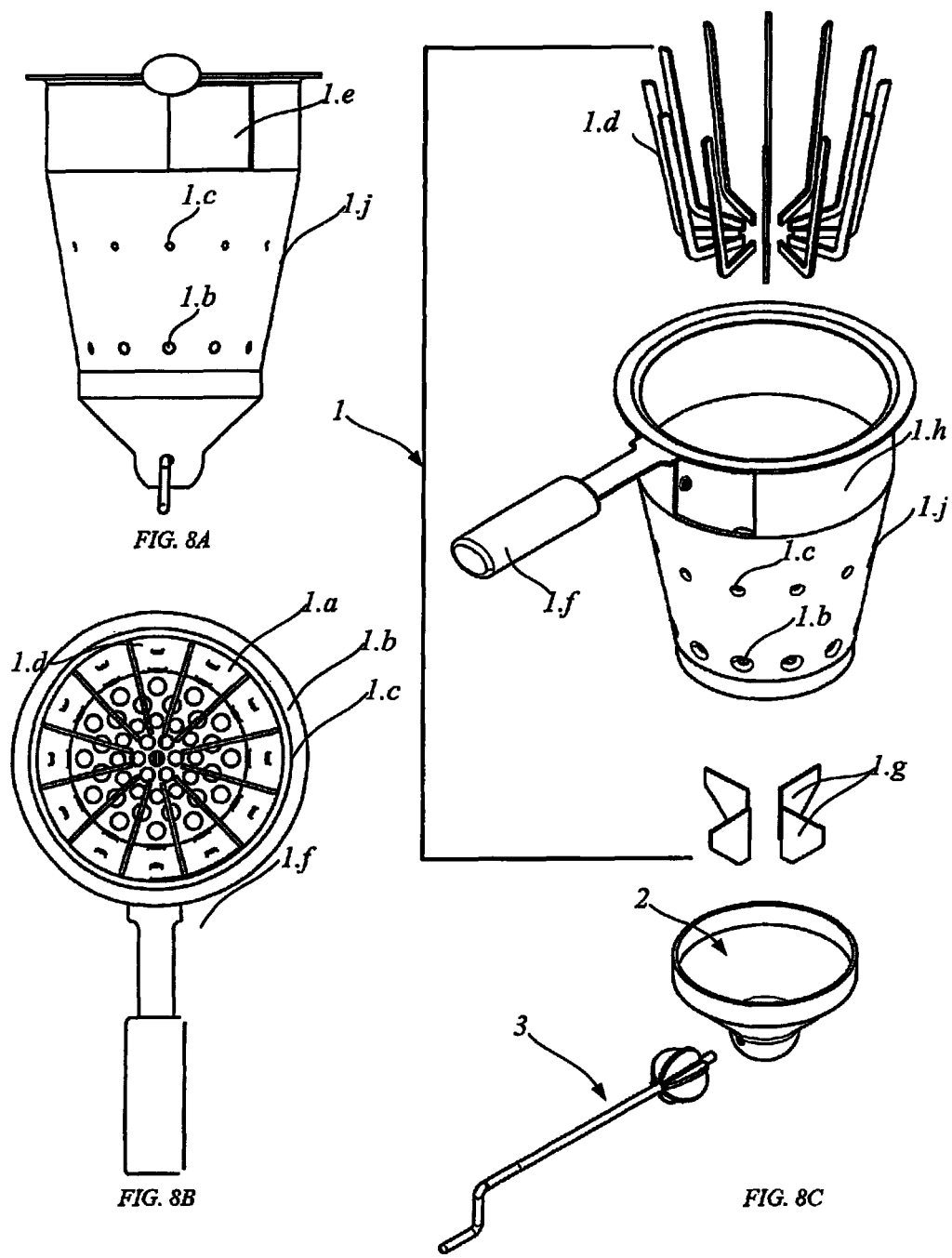
FIGS. 8A-C further show aspects of the combustion chamber, including frontal and bottom views of the combustion chamber shown in FIGS. 8A and 8B; and in FIG. 8C, an exploded view of the combustion chamber, ashtray, and a butterfly valve.

Firewood is inserted, for its combustion, into the combustion chamber burner through a "U" shaped opening 5.*e* cut through all the layers of the insulation chamber. The opening takes the form of a canal and is aligned with the square opening 1.*e* located in the upper part of the combustion chamber (e.g. as shown in FIGS. 7A, 7C). The firewood intake opening also makes it possible to observe the fire plate and the combustion of the firewood inside of the combustion chamber 1 for the successful management of the fire.

An inverted bell-shaped ashtray 2 is located below the combustion chamber 1 (see e.g. FIG. 6). It cuts in the two lower layers of the insulation chamber to reach the combustion chamber's outer layer, as seen in FIG. 9A and FIG. 11B. It receives the ashes generated by the combustion and falling through the perforations of the fire plate 1.*a*. This ashtray 2 has, in its lower part, a butterfly valve 3 (see e.g. FIG. 6) operated by a crank 3.*a* which makes it possible to expel the ashes to a collector 6 (FIG. 6) for final disposal (see e.g. FIG. 11B). The ash collector 2 is shaped like a cup, is located exactly bellow the butterfly valve 3 and coupled with the bottom of the tube of the insulation chamber 5.*c* by coupling tabs 6.*a*. The ash collector can be attached or removed from the insulation chamber by twisting it (see e.g. FIG. 6).

The handle 1.*f*, located at the top of the combustion chamber 1, helps to rotate the combustion chamber inside the insulation chamber (see FIG. 7), misaligning the U shape fire intake opening 5.*e* with the square opening 1.*e* located at the top of the combustion chamber 1; this mismatch makes it possible to close the firewood intake opening 5.*e* and to stop the heat from escaping through the firewood intake opening 5.*e* making it possible to transfer most of the heat to the cookware 11.

Four blades, see e.g. 1.*g* in FIG. 6 and detail E of FIG. 9B, welded to the bottom of the fire grill 1.*a* remove the ashes deposited in the ashtray 2 to get them to the butterfly valve 3, achieving an almost total removal of this ashes FIG. 11; these blades 1.*g* which are operated with the same rotating movement achieved with the combustion chamber's handle 1.*f*, are separated at a prudent distance from the bell shaped side of the ashtray 2 and allow, in the twisting motion, to leave a layer of ash between blade 1.*g* and part of the sloping 2 ashtray. This layer of ash, which is a good natural insulation, insulates the heat irradiated by the fire grill 1.*a* to the ashtray 2, (see e.g. FIG. 9 and FIG. 11).

A gate valve 4.*b*, FIG. 6 and FIG. 12, is located between the fan 4.*a* and the ventilation duct 4.*c* that is part of the air conduit system and connects to the insulation chamber 5, facilitates the regulation of airflow which fuels combustion and controls an increase or decrease in the firewood flame within the combustion chamber 1; this variation of the air allows to control the flame at will, and the amount of heat needed by the cookware 11. This gate valve 4.*b* has an opening 4.*d* located between the fan 4.*a* and the gate valve, which allows unused air in the combustion to be expelled in order to ensure the continued cooling of the combustion chamber 1 (see e.g. FIG. 11 and FIG. 12).

Some of the other features of the combustion chamber of the present invention are as follows:

The ignition of the fire is easier because the combustion chamber can receive and stack chips and small pieces of wood, which facilitates the initiation of combustion.

Thanks to the manner in which firewood is stacked and supported inside of the combustion chamber, the temperature at the bottom of the combustion chamber is high enough to ensure the easy combustion of all the volatile organic compounds produced by the firewood as it burns.

The re-ignition after combustion has been completed is easier because when you add new fuel to the burner, these new pieces of firewood are in contact with the remains of combustion lit earlier, thanks to the narrowing of the bottom of the combustion chamber.

There is a better control of the combustion because of the small space at the bottom of the combustion chamber (1) since the oxygenation is more effective.

Figures 14, 14A:
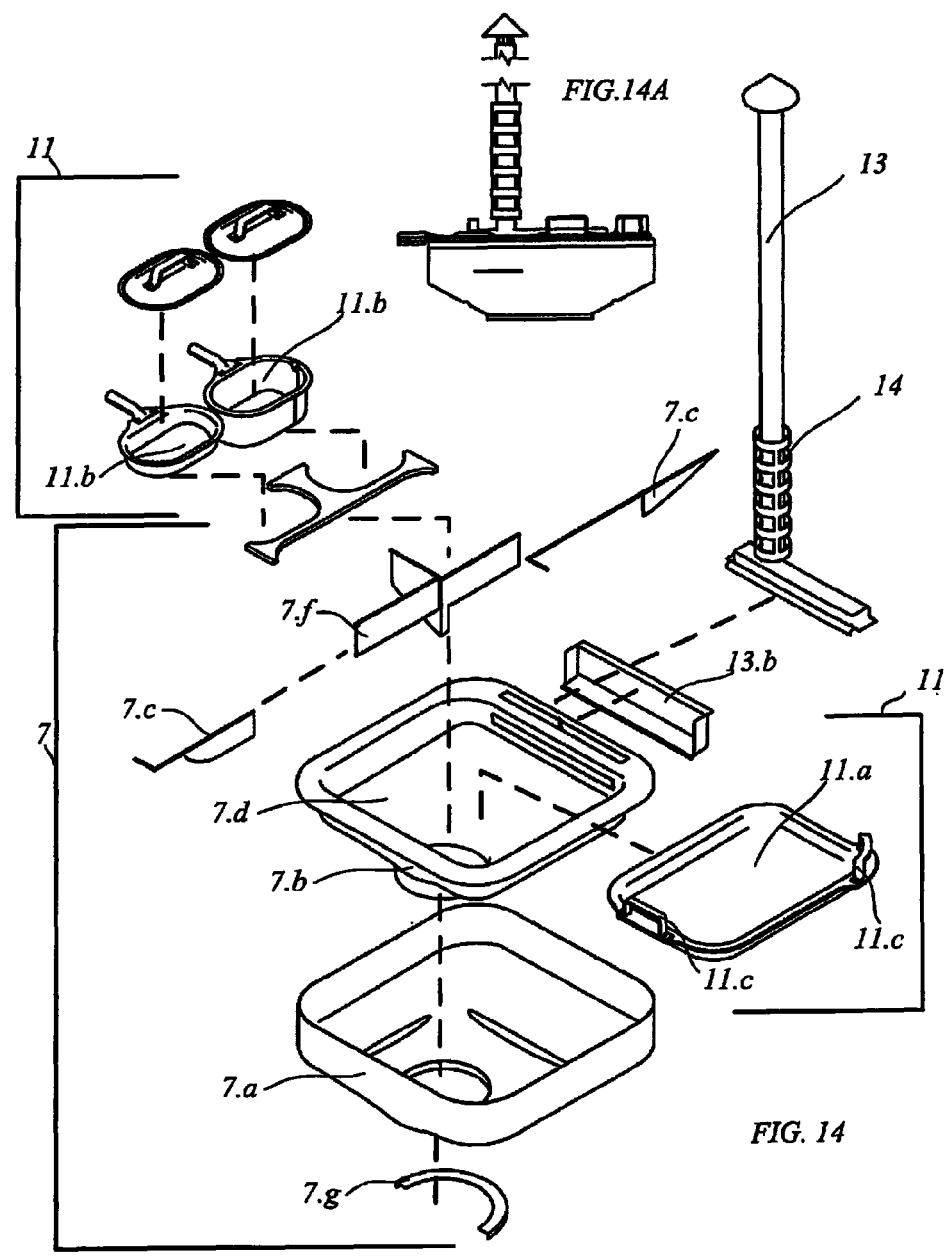
FIG. 14 is an exploded view of the heat transferring device depicted in FIG. 13 (with FIG. 14A provided as a reference)

Heat Transferring Unit (FIG. 13 and FIG. 14)

An insulation shell 7, which is shaped like a rectangular box at the top and which provides a heating chamber 7.*d* in heat transfer relation with the upper end of the combustion chamber, is the connection that enables the transfer of the heat generated in the combustion chamber 1 to cookware, which can comprise a group of cookware 11, or individual cookware components 11*a*, 11*b*. This insulation shell 7 consists of two pieces assembled one inside the other 7*a* and 7*b*, but separated from each other to allow room for insulating air that stops heat from escaping (see FIG. 15) and helps the heat transfer process from the combustion chamber 1 to the cookware 11. Specifically, the heating plate 11.*a* provides a top cover for the heating chamber 7.*d*, and also forms a cookware component for food product being heating directly from the heating plate 11.*a*. The heating plate 11*a* is placed on the heating chamber 7.*d* to close the top end of the heating chamber 7*d*. Other cookware components 11*b* can also be placed in heat transfer relation with the heating chamber 7*d*, as described herein. The insulation shell 7 maintains the outside of the heating chamber cold to prevent burning accidents. Immediately after the fire has completed its combustion process and leaves the combustion chamber 1, heated gases pass to the heating chamber 7.*d* inside of the insulation shell 7 (see FIG. 15) where the volume of the heating chamber is bigger than the combustion chamber 1; this generates a new expansion which diminishes the speed of the hot gasses ready to transfer their heat. This new expansion process improves the uniformity of heat below the cookware components 11.*a*, 11.*b*, achieving a better distribution of heat.

Figure 2:
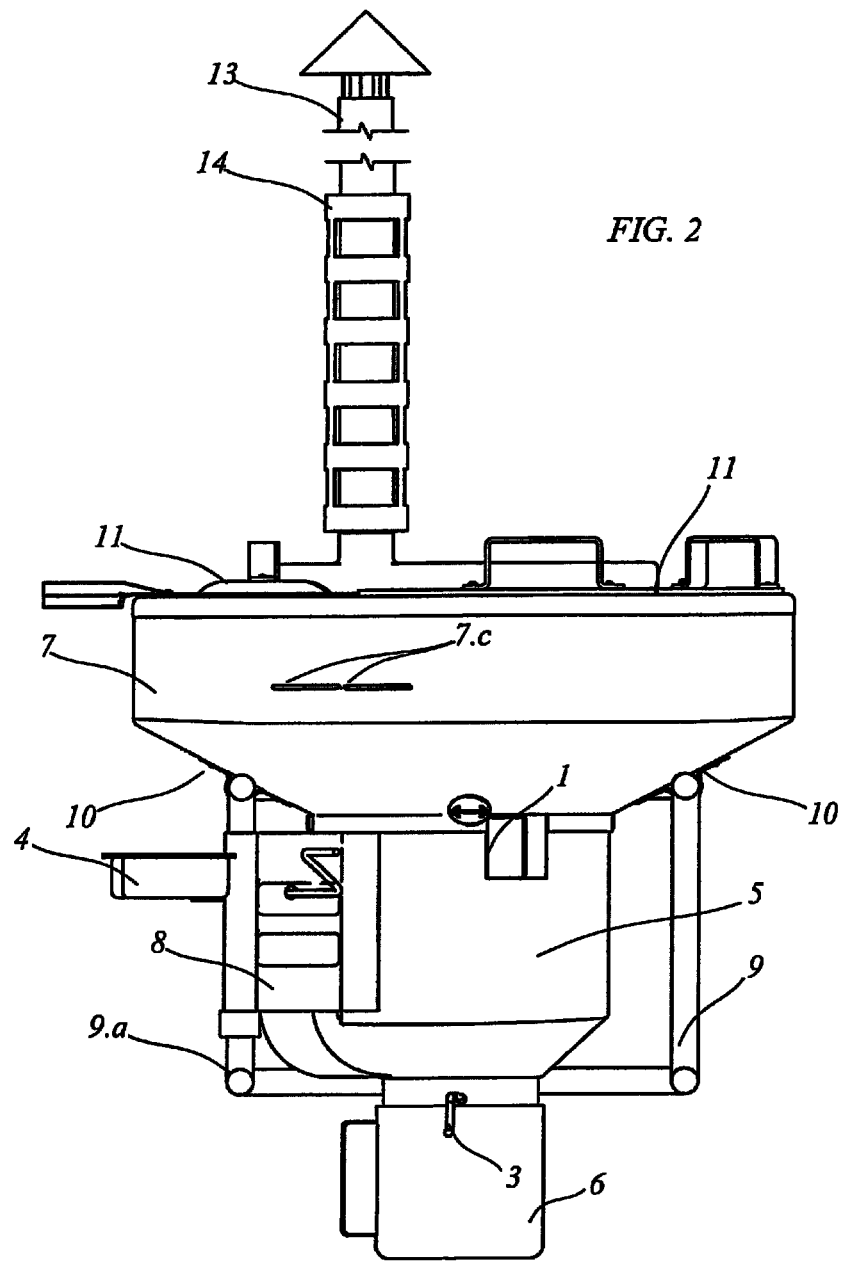
FIG. 2 is a front view of the heat generating/transferring device of FIG. 1.

A couple of simple gate valves 7.*c* (FIGS. 2, 14) which are mounted inside the insulation shell 7, make it possible to handle, with heat from a single combustion chamber 1, more than one piece of cookware (e.g. cookware components 11*a* and/or 11.*b*); these valves 7.*c* which are positioned near the exit of the combustion chamber, divert part of the hot gases to the other cookware components 11.*b*, which make cooking easier.

Figures 16, 16A, 16B:
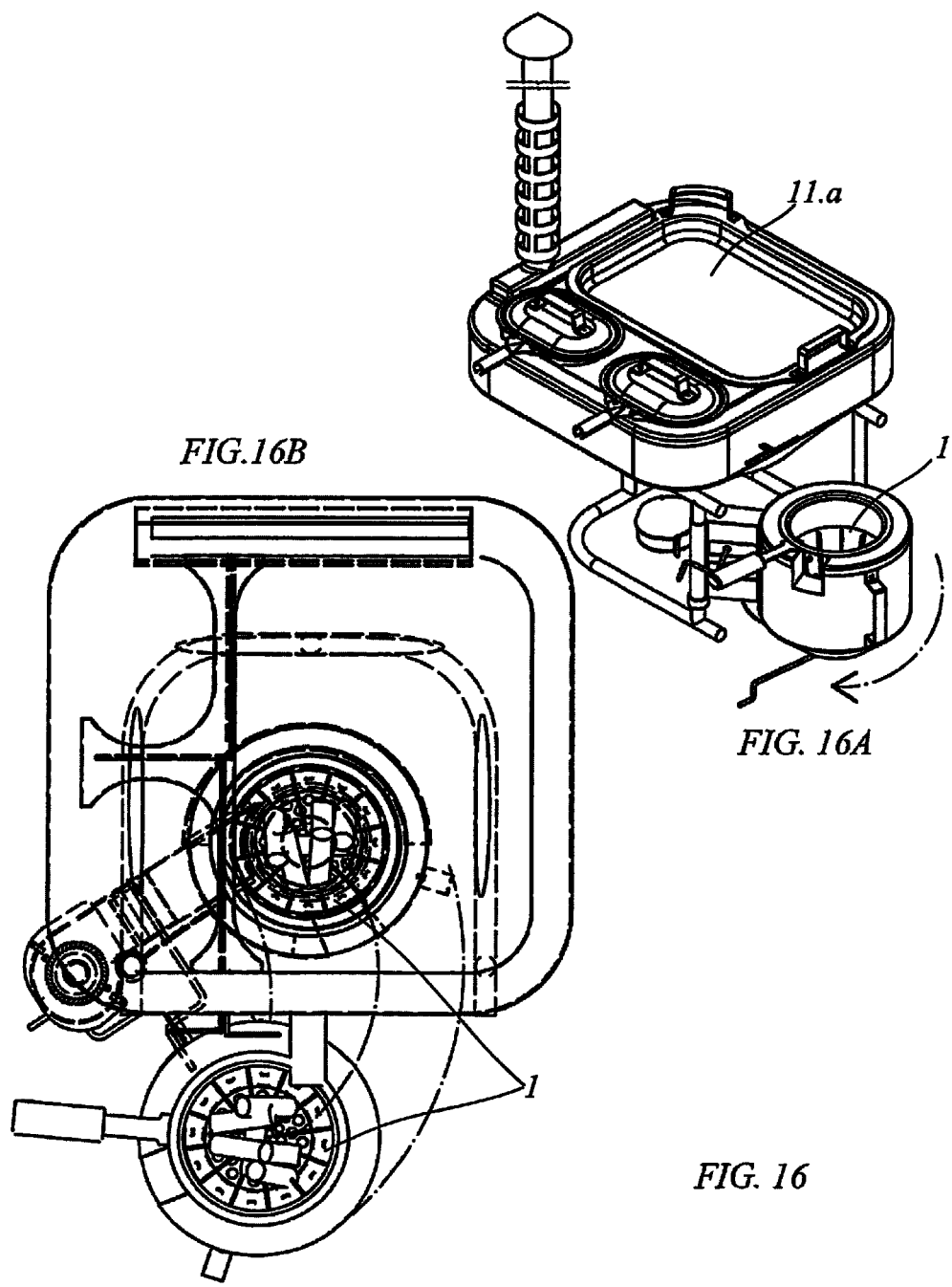
FIGS. 16A and B are isometric and top views, respectively, of the heat transferring device, schematically illustrating the rotating motion of the heat transferring unit for loading a mass of firewood, according to the principles of the present invention.

A hinge system 8 (see FIG. 4) which connects the combustion chamber 1 with a pivot bar 9.*a* installed in a saddle attached to the worktable 12, supports the combustion chamber and enables the removal of the combustion chamber from below the heat transferring chamber 7.*d*, allowing the fire to begin or resume with ease (see FIG. 16).

Figure 17:
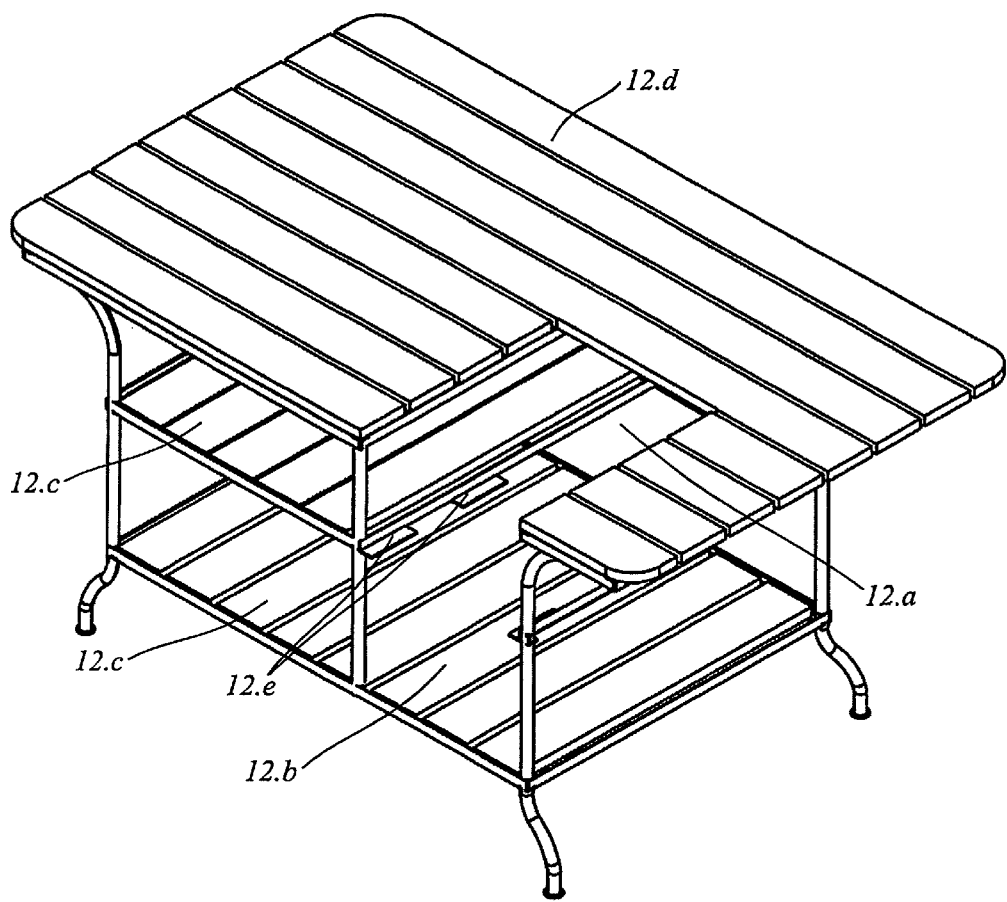
FIG. 17 is an isometric view of the worktable that is used in cooking and serving food, according to the principles of the present invention.

The heat generating/transferring device (i.e. the combustion chamber 1 and the heating chamber 7.d) are located in a special space at the front side of the worktable 12 (FIG. 17), which is made of metal and wood. Thus, the combustion chamber 1 and the heating chamber 7.d are in an "off center" orientation on the worktable. Moreover, as can be seen from the figures, the combustion chamber 1 is offset with respect to the center of the heating chamber 7.d, in an orientation that facilitates access to the opening 1.e in the vertically oriented wall structure 1.j, so as to facilitate viewing of the state of combustion in the combustion chamber and insertion of additional carbon based fuel into the combustion chamber while combustion is taking place in the combustion chamber. The off center position of the combustion chamber relative to the worktable and to the heating chamber is useful because allows the user to monitor the fire, to add more firewood easily, to disengage the combustion chamber from the heating chamber and to force the heat to travel along the bottom of the entire array of cooking components before it exits the heating chamber. These functions would be less practical if the combustion chamber were perfectly centered in relationship to the worktable and/or the heating chamber. In addition, the worktable also provides a place to store firewood 12.b, a convenient surface to accommodate cookware and a work area; located on the front of the table there is space where several (e.g. two or three) people can be accommodated to eat 12.d.

The cookware 11, i.e. cookware components 11.a and/or 11.b (FIG. 15), are designed to catch as much heat as possible; they are immersed in the insulating shell 7 while the wide rim 11.e at the upper end of the heating plate, substantially seals the heating chamber and stops the hot gasses from escaping. In this way, the best heat transfer contact between the cookware and the hot gasses generated by the combustion is achieved. The cookware components have handles attached to them (see e.g. 11.c. FIG. 13); the first handle is placed on the right back corner of the cookware 11, which minimizes the effort needed to lift it and at the same time keeps the users arm far from the cooking area. This first handle is balanced by a second one 11.c placed on the front left of the cooking area.

A Chimney 13, with a frame 14 (see. e.g. FIG. 13 and FIG. 15) is placed on the back of the insulating shell 7, and collects the gasses left over from the combustion and after they that have unloaded their heat in the cooking process and are expelled at a convenient height to not affect the users.

Cooking Method

In a cooking method according to the principles of the present invention, vertically oriented, combustion chamber 1 is provided with its vertically oriented wall structure having a relatively narrow, lower portion, and a relatively wider upper portion, and air inlet openings located in the vertically oriented wall structure to enable air to be directed into the combustion chamber. Moreover, the heating chamber 7.d is provided above and in heat transfer relationship with the relatively wider upper portion of the combustion chamber 1 and food heating plate structure 11.a in direct heat transfer relation with the heating chamber. A mass of carbon based fuel is located in the relatively narrow lower portion of the combustion chamber, above the bottom of the lower portion of the combustion chamber, and spaced from the air inlet openings in the vertically oriented wall structure of the combustion chamber. Air is directed along a predetermined path that enables the air to enter the combustion chamber through the air inlet openings in the vertically oriented wall structure, in a manner that supports combustion of the carbon based fuel in the combustion chamber, and generation of heat from the combustion of the carbon based fuel; and substantially all of the heat generated from combustion of the carbon based fuel in the combustion chamber is directed into the heating chamber, so that substantially all of the heat from the combustion chamber is transferred to the food heating plate structure.

According to a preferred method, the air is directed along a path that is along a path that enables air to flow into the combustion chamber in directions lateral to the mass of carbon based fuel located in the combustion chamber, and in a manner that enables at least some air to flow into the area below the mass of carbon based fuel and at least some of the air to flow into the combustion chamber above the mass of carbon based fuel, further to enhance the efficiency with which heat is generated from the carbon based fuel in the combustion chamber. Also, the air is directed along a path that enables at least some air to flow into the combustion chamber above the mass of carbon based fuel located in the narrow portion of the combustion chamber enables the air that flows into the combustion chamber above the mass of carbon based fuel located in the combustion chamber to create air turbulence above the mass of carbon based fuel located in the combustion chamber. The air that is directed along the predetermined path is swept along the exterior of the combustion chamber, in a substantially spiral path, so that heat from the exterior of the combustion chamber is transferred to the air that is being swept along the exterior of the combustion chamber.

In a preferred method, according to the present invention, the carbon based fuel comprises a cellulose based fuel, preferably wood, and ash resulting from the combustion of the carbon based fuel in the combustion chamber is selectively removed from the combustion chamber 1, without insertion of any removal instrument into the combustion chamber, while combustion of the carbon based fuel is continuing in the combustion chamber. Also, the combustion chamber 1 is pivoted to a position in which it is removed from heat transfer relationship with the heating chamber (see e.g. FIGS. 16A and 16B) to enable a mass of carbon based fuel to be located in the combustion chamber, and thereafter the combustion chamber is pivoted to a position in which the heating chamber is in heat transfer relationship with the relatively wider upper portion of the combustion chamber.

Still further, in a preferred method according to the principles of the present invention, a plurality of food heating cookware is provided, each of which is in direct heat transfer relationship with the heating chamber 7.d, and substantially all of the heat generated from combustion of the carbon based fuel in the combustion chamber is directed to respective portions of the cookware, to transfer substantially all of the heat from the combustion chamber to the cookware.

The vertically oriented wall structure 1.j of the combustion chamber has an opening 1.e that can be selectively covered or uncovered, the opening when uncovered positioned to enable the state of combustion and the state of the carbon based fuel in the combustion chamber to be viewed while combustion is taking place in the combustion chamber and to enable insertion of additional carbon based fuel into the combustion chamber while combustion is taking place in the combustion chamber.

The support structure comprises a basket like structure 1.d comprising a plurality of ribs disposed inside the combustion chamber, the ribs located and configured to support a mass of carbon based fuel away from the bottom and the arrays of openings 1.b, 1.c in the vertically oriented wall structure.

The heating plate structure 11.a and the heating chamber 7.d are configured such that heat and/or heated air from the heating chamber will sweep along heating plate structure in a predetermined direction (FIG. 15) as heat is being transferred to the heating plate structure.

The heating plate structure comprises one or more heating plates in heat transfer relationship with respective portions of the heating chamber.

A layer of insulation 7 surrounds the walls of the heating chamber, to minimize transfer of heat from the walls of the heating chamber to the environment outside the heating chamber.

Thus, the foregoing description provides an exemplary embodiment of a new heat generating/transferring structure and method, and to a new and useful way of cooking food with the heat generating/transferring structure. With the foregoing description in mind, various ways of generating heat from a mass of carbon fuel, transferring heat to a product (e.g. a food product), and providing an integrated food cooking system and method, in accordance with the principles of the present invention, will become apparent to those in the art.

The invention claimed is:

1. A device for generating heat from a carbon based fuel, comprising
    a. a vertically oriented combustion chamber that is substantially closed to the atmosphere and has a relatively narrow, lower portion, a relatively wider upper portion, and a vertically oriented wall structure defining the combustion chamber; the vertically oriented wall structure configured with a relatively narrow, lower portion and a relatively wider portion and having a plurality of inlet openings to enable air to enter the combustion chamber,
    b. a source of air in fluid communication with the wall structure of the combustion chamber, and a fluid conduit configured to direct air from the source along a predetermined path about the vertically oriented wall structure of the combustion chamber;
    c. the combustion chamber having a fuel support structure that (i) supports a mass of a carbon based fuel in the relatively narrow, lower portion of the combustion chamber, above the bottom of the combustion chamber and away from the air inlet openings in the vertically oriented wall structure; and (ii) enables air flowing along the predetermined path about the vertically oriented wall structure to flow into the combustion chamber through the inlet openings; whereby the air entering the combustion chamber can substantially envelop and support combustion of the mass of carbon based fuel located in the combustion chamber; and
    d. the relatively narrow and wider portions of the combustion chamber configured to allow gases generated from combustion of the carbon based fuel in the relatively narrow portion of the combustion chamber to expand as they rise into the relatively wider portion of the combustion chamber, in a manner that reduces the output speed of the gases, increases the residence time of the gases in the combustion chamber, thereby to improve the efficiency with which heat is generated in the combustion chamber from the carbon based fuel;
    e. wherein the air inlet openings comprise first and second arrays of air inlet openings in the vertically oriented wall structure of the combustion chamber, each of the first and second arrays of air inlet openings oriented to enable air to enter the combustion chamber in a direction that is lateral to the vertical direction of the combustion chamber, the first array of air inlet openings oriented to enable air to enter the narrow portion of the combustion chamber in a manner such that at least some air can flow into the area between a mass of carbon based fuel and the bottom of the combustion chamber, and the second array of air inlet openings oriented in relation to the mass of carbon based fuel in the combustion chamber to enable air to enter the combustion chamber so that at least some of the air that enters the combustion chamber through the second array of air inlet openings is above the mass of carbon based fuel located in the narrow portion of the combustion chamber, and
    f. wherein the fluid conduit enables air flow about the vertically oriented wall of the combustion chamber from the first array of openings to the second array of openings, so that the air entering the combustion chamber through the second array of openings has been heated by its contact with the wall of the combustion chamber as the air enters the combustion chamber through the second array of openings;
    g. whereby substantially complete combustion of the carbon based fuel, including the volatile organic compounds of the carbon based fuel, is produced in the combustion chamber; and h. an insulation structure extends about the vertically oriented wall structure of the combustion chamber, and wherein the fluid conduit that directs air about the combustion chamber is disposed between the insulation layer and the vertically oriented wall structure of the combustion chamber, so that air directed by the fluid conduit is swept along the exterior of the vertically oriented wall structure and is efficiently heated by its contact with the exterior of the vertically oriented wall structure.

2. The device of claim 1, wherein the second array of air inlet openings is also oriented so that air entering the combustion chamber above a mass of carbon based fuel is oriented to create air turbulence above a mass of carbon based fuel located in the combustion chamber, so that the configuration of the combustion chamber, the air entering the combustion chamber through the second array of air inlet openings, and the air turbulence promote substantially complete combustion of the volatile organic compounds of the carbon based fuel.

3. The device of claim 2, wherein the support structure is configured to support a mass of wood in the narrow portion of the combustion chamber, so that the mass of wood provides the carbon based fuel for the combustion chamber.

4. The device of claim 2, wherein a heating chamber is provided above and in heat transfer relationship with the relatively wider portion of the combustion chamber, and heating plate structure substantially closes and is in heat transfer relationship with the heating chamber, so that substantially all heat from the heating chamber is transferred to the heating plate structure, and the heating plate structure is configured to heat a food product or a cookware component disposed on the heating plate structure.

5. The device of claim 4, wherein the heating plate structure and the heating chamber are configured such that heat and/or heated air from the heating chamber will sweep along the heating plate structure in a predetermined direction as heat is being transferred to the heating plate structure.

6. The device of claim 1, wherein the fluid conduit is further configured to direct air along a substantially spiral path, whereby the air is swept in a spiral path along the vertically oriented wall structure, and heat from the wall structure is transferred to the air being swept in the spiral path.

7. The device of claim 2, further including an ash collection container disposed below the narrow portion of the combustion chamber, and wherein a valve is located between the bottom of the combustion chamber and the ash collection container and the valve is configured such that it can be selectively opened by manipulation of a handle extending outside the combustion chamber, while combustion of the carbon fuel in the combustion chamber is continuing, to enable ashes resulting from combustion of the carbon based fuel in the combustion chamber to be deposited into the ash collection container while combustion in the combustion chamber is continuing.

8. The device of claim 2, wherein the combustion chamber is supported for movement between an operating position in which the air source is in fluid communication with the wall structure of the combustion chamber, and a fuel loading position in which the combustion chamber is moved away from the heating plate, to enable a load of fuel to be inserted into the combustion chamber, and wherein the combustion chamber has a handle that enables the combustion chamber to be manually manipulated between the fuel loading position and the operating position.

9. The device of claim 8, wherein the combustion chamber is also supported for movement between a fuel inserting position in which fuel can be loaded into the combustion chamber through an opening in the combustion chamber while combustion in the combustion chamber is continuing, and a closed position in which the opening in the combustions chamber is blocked, so that fuel cannot be loaded into the combustion chamber while combustion in the combustion chamber is continuing, and wherein the handle enables the combustion chamber to be selectively manipulated between the fuel inserting position and the closed position while combustion in the combustion chamber is continuing.

10. The device of claim 2, wherein the vertically oriented wall structure of the combustion chamber has an opening that can be selectively covered or uncovered, the opening when uncovered positioned to enable the state of combustion and the state of the carbon based fuel in the combustion chamber to be viewed while combustion is taking place in the combustion chamber and to enable insertion of additional carbon based fuel into the combustion chamber while combustion is taking place in the combustion chamber.

11. The device of claim 2, wherein the fuel support structure comprises a basket like structure comprising a plurality of ribs disposed inside the combustion chamber, the ribs located and configured to support the mass of carbon based fuel away from the vertically oriented wall structure and away from the bottom of the combustion chamber.

12. The device of claim 4, wherein the combustion chamber, heating chamber and heating plate structure are supported by a worktable wherein cooked food products can be placed for consumption, the worktable having a side that is conveniently accessible to a cook who is cooking food at the device, and that side of the worktable has an opening where the combustion chamber, heating chamber and heating plate structure are located.

13. The device of claim 11, wherein a plurality of cookware components are in heat transfer relationship with respective portions of the heating chamber.

14. The device of claim 13, wherein a control structure is provided for selectively directing heat and/or heated air from the combustion chamber to any or all of the cookware components, to selectively control which of the cookware components is used to cook food.

15. The device of claim 14, wherein a layer of insulation surrounds the walls of the heating chamber, to minimize transfer of heat from the walls of the heating chamber to the environment outside the heating chamber.

16. The device of claim 12, wherein the vertically oriented wall structure of the combustion chamber has an opening that can be selectively covered or uncovered, the opening when uncovered positioned to enable the state of combustion and the state of the carbon based fuel in the combustion chamber to be viewed while combustion is taking place in the combustion chamber and to enable insertion of additional carbon based fuel into the combustion chamber while combustion is taking place in the combustion chamber, and wherein the combustion chamber is offset with respect to the center of the heating chamber, in an orientation that facilitates access to the opening in the vertically oriented wall structure, so as to facilitate viewing of the state of combustion in the combustion chamber and insertion of additional carbon based fuel into the combustion chamber while combustion is taking place in the combustion chamber.

17. The device of claim 4, wherein the vertically oriented wall structure of the combustion chamber has an opening that can be selectively covered or uncovered, the opening when uncovered positioned to enable the state of combustion and the state of the carbon based fuel in the combustion chamber to be viewed while combustion is taking place in the combustion chamber and to enable insertion of additional carbon based fuel into the combustion chamber while combustion is taking place in the combustion chamber, and wherein the combustion chamber is offset with respect to the center of the heating chamber, in an orientation that facilitates access to the opening in the vertically oriented wall structure, so as to facilitate viewing of the state of combustion in the combustion chamber and insertion of additional carbon based fuel into the combustion chamber while combustion is taking place in the combustion chamber.

18. A method of generating heat from a carbon based fuel, comprising
   a. providing a vertically oriented, combustion chamber with a vertically oriented wall structure having a relatively narrow, lower portion, and a relatively wider upper portion, and first and second arrays of air inlet openings in the vertically oriented wall structure of the combustion chamber, each of the first and second arrays of air inlet openings oriented to enable air to enter the combustion chamber in a direction that is lateral to the vertical direction of the combustion chamber, the first array of air inlet openings oriented to direct air to enter the narrow portion of the combustion chamber in a manner such that at least some air can flow into the area between a mass of carbon based fuel and the bottom of the combustion chamber, and the second array of air inlet openings oriented in relation to the mass of carbon based fuel in the combustion chamber to direct air to enter the combustion chamber so that at least some of the air that enters the combustion chamber through the second array of air inlet openings is above a mass of carbon based fuel located in the narrow portion of the combustion chamber;
   b. providing a heating chamber located in the combustion chamber above and in heat transfer relationship with the relatively wider upper portion of the combustion chamber;
   c. locating a mass of carbon based fuel in the relatively narrow lower portion of the combustion chamber, above the bottom of the lower portion of the combustion chamber, and spaced from the air inlet openings in the vertically oriented wall structure of the combustion chamber;
   d. directing air in a fluid conduit and along a predetermined path that guides the air to enter the combustion chamber through the air inlet openings in the vertically oriented wall structure, in a manner that supports combustion of the carbon based fuel in the combustion chamber, and generation of heat from the combustion of the carbon based fuel;
   e. allowing gases generated from combustion of the carbon based fuel in the relatively narrow portion of the combustion chamber to expand as they rise into the relatively wider portion of the combustion chamber, in a manner that reduces the output speed of the gases, increases the residence time of the gases in the combustion chamber, thereby to improve the efficiency with which heat is generated in the combustion chamber from the carbon based fuel;

f. wherein the fluid conduit also direct air flow about the vertically oriented wall of the combustion chamber from the first array of openings to the second array of openings, and in such a manner that the air entering the combustion chamber through the second array of openings has been heated by its contact with the wall of the combustion chamber as the air enters the combustion chamber through the second array of openings, and produces substantially complete combustion of the carbon based fuel, including the volatile organic compounds of the carbon based fuel is produced in the combustion chamber, and g. directing substantially all of the heat generated from substantially complete combustion of the carbon based fuel in the combustion chamber into the heating chamber; and h. providing an insulation structure that extends about the vertically oriented wall structure of the combustion chamber, and wherein the fluid conduit that directs air about the combustion chamber is disposed between the insulation layer and the vertically oriented wall structure of the combustion chamber, so that air directed by the fluid conduit is swept along the exterior of the vertically oriented wall structure and is efficiently heated by its contact with the exterior of the vertically oriented wall structure.

19. The method of claim 18, wherein ash resulting from the combustion of carbon based fuel in the combustion chamber is selectively removed from the combustion chamber, without insertion of any removal instrument into the combustion chamber, while combustion of the carbon based fuel is continuing in the combustion chamber.

20. The method of claim 18 wherein the air is swept in a substantially spiral path along the exterior of the combustion chamber.

21. The method of claim 20, wherein carbon based fuel comprises a cellulose based fuel.

22. The method of claim 21, wherein the cellulose based fuel comprises wood.

23. The method of claim 18, wherein ash resulting from the combustion of carbon based fuel in the combustion chamber is selectively removed from the combustion chamber, without insertion of any removal instrument into the combustion chamber, while combustion of the carbon based fuel is continuing in the combustion chamber.

24. The method of claim 18, including pivoting the combustion chamber to a position in which it is removed from heat transfer relationship with the heating chamber to enable a mass of carbon based fuel to be located in the combustion chamber, and thereafter pivoting the combustion chamber to a position in which the heating chamber is in heat transfer relationship with the relatively wider upper portion of the combustion chamber.

25. The method of claim 18, including providing a plurality of cookware components, each of which is disposed in direct heat transfer relationship with the heat transfer chamber, and directing substantially all of the heat generated from combustion of the carbon based fuel in the combustion chamber to respective portions of the heat transfer chamber, to transfer substantially all of the heat from the combustion chamber to the plurality of cookware components.

* * * * *